(12) United States Patent
Sugiyama et al.

(10) Patent No.: US 11,318,754 B2
(45) Date of Patent: *May 3, 2022

(54) INK JET PRINTING CLEAR INK COMPOSITION, INK JET PRINTING INK SET, AND INK JET PRINTING METHOD

(71) Applicant: Seiko Epson Corporation, Tokyo (JP)

(72) Inventors: Takako Sugiyama, Azumino (JP); Masakazu Ohashi, Shiojiri (JP); Kosuke Chidate, Shiojiri (JP)

(73) Assignee: Seiko Epson Corporation

( * ) Notice: Subject to any disclaimer, the term of this patent is extended or adjusted under 35 U.S.C. 154(b) by 15 days.

This patent is subject to a terminal disclaimer.

(21) Appl. No.: 16/354,403

(22) Filed: Mar. 15, 2019

(65) Prior Publication Data

US 2019/0284420 A1    Sep. 19, 2019

(30) Foreign Application Priority Data

Mar. 16, 2018 (JP) .............................. JP2018-049596

(51) Int. Cl.

| | |
|---|---|
| *B41J 2/21* | (2006.01) |
| *B41J 3/407* | (2006.01) |
| *B41M 5/00* | (2006.01) |
| *C09D 11/033* | (2014.01) |
| *C09D 11/102* | (2014.01) |
| *C09D 11/38* | (2014.01) |
| *C09D 11/40* | (2014.01) |
| *C09D 11/12* | (2006.01) |
| *C09D 11/322* | (2014.01) |
| *C09D 11/30* | (2014.01) |
| *D06P 1/52* | (2006.01) |
| *D06P 1/00* | (2006.01) |
| *D06P 5/30* | (2006.01) |

(52) U.S. Cl.
CPC ........... *B41J 2/2114* (2013.01); *B41J 3/4078* (2013.01); *B41M 5/0023* (2013.01); *C09D 11/033* (2013.01); *C09D 11/102* (2013.01); *C09D 11/12* (2013.01); *C09D 11/30* (2013.01); *C09D 11/322* (2013.01); *C09D 11/38* (2013.01); *C09D 11/40* (2013.01); *D06P 1/00* (2013.01); *D06P 1/5285* (2013.01); *D06P 5/30* (2013.01)

(58) Field of Classification Search
CPC .... B41J 2/2114; B41J 3/4078; B41M 5/0023; C09D 11/033; C09D 11/102; C09D 11/38; C09D 11/40; C09D 11/12; C09D 11/322; C09D 11/30; D06P 1/5285; D06P 1/00; D06P 5/30
See application file for complete search history.

(56) References Cited

U.S. PATENT DOCUMENTS

| | | | |
|---|---|---|---|
| 4,046,729 A * | 9/1977 | Scriven ............. | C08G 18/0804 524/589 |
| 4,290,988 A | 9/1981 | Nopper et al. | |
| 4,382,758 A | 5/1983 | Nopper et al. | |
| 6,051,645 A * | 4/2000 | Suzuki ................ | C09D 11/326 524/500 |
| 9,096,771 B2 | 8/2015 | Okuda et al. | |
| 9,321,921 B2 | 4/2016 | Namba | |
| 9,624,393 B2 * | 4/2017 | Ohta ....................... | C09D 11/30 |
| 2010/0091052 A1 | 4/2010 | Ogawa et al. | |
| 2013/0201252 A1 | 8/2013 | Namba | |
| 2015/0204015 A1 | 7/2015 | Gomi et al. | |
| 2016/0193754 A1 | 7/2016 | Gomi et al. | |
| 2017/0121543 A1 | 5/2017 | Sakaguchi et al. | |
| 2017/0203478 A1 | 7/2017 | Gomi et al. | |
| 2018/0072073 A1 | 3/2018 | Makuta | |
| 2018/0244935 A1 * | 8/2018 | Sakaguchi ............. | C09D 11/36 |
| 2018/0257104 A1 * | 9/2018 | Che ......................... | G02B 3/06 |
| 2020/0095439 A1 * | 3/2020 | Okada ..................... | D06P 5/15 |

FOREIGN PATENT DOCUMENTS

| | | |
|---|---|---|
| EP | 3 382 093 A1 | 10/2018 |
| JP | S55-090659 A | 7/1980 |
| JP | H03-076885 A | 4/1991 |
| JP | 2009-030014 A | 2/2009 |
| JP | 2010-106377 A | 5/2010 |
| JP | 2013-176972 A | 9/2013 |
| JP | 2016-186146 A | 10/2016 |
| JP | 2017-043681 A | 3/2017 |
| WO | WO-2017-098920 A1 | 6/2017 |

OTHER PUBLICATIONS

Extended European Search Report for Application No. EP 19 16 3291 dated Jul. 22, 2019 (7 pages).

* cited by examiner

*Primary Examiner* — Patrick D Niland
(74) *Attorney, Agent, or Firm* — Harness, Dickey & Pierce, P.L.C.

(57) ABSTRACT

An ink jet printing clear ink composition includes resin particles; a lubricant; and water. The resin particles includes a urethane resin having a cross-linking group, and the clear ink composition is formed into a dried coating film having a Young's modulus of 5 to 70 MPa.

17 Claims, 1 Drawing Sheet

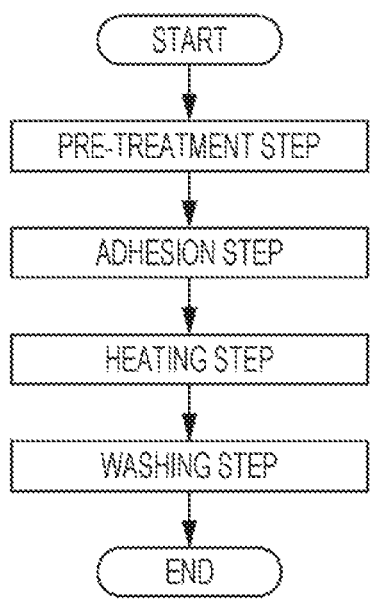

INK JET PRINTING CLEAR INK COMPOSITION, INK JET PRINTING INK SET, AND INK JET PRINTING METHOD

BACKGROUND

1. Technical Field

The present invention relates to an ink jet printing clear ink composition, an ink jet printing ink set, and an ink jet printing method.

2. Related Art

Since capable of recording a highly fine image using a relatively simple apparatus, an ink jet recording method has been rapidly developed in various fields. In particular, various types of studies have been carried out on an ink jet printing method which is applied to cloths. In the ink jet printing method, in view of excellent fixing properties to cloths and the like, in general, a pigment ink is frequently used than a dye ink. However, by ink jet printing using a pigment ink, a sufficient abrasion fastness has not been obtained.

JP-A-2017-43681 has disclosed an ink jet printing ink which contains a pigment, a polyester-based binder resin, a cross-linking agent cross-linking the polyester-based binder resin, and an aqueous organic solvent which dissolves the above components under specific conditions. The patent literature described above also has disclosed that when the above ink jet printing ink containing those components is coated on a cloth by an ink jet method, and when cross-linking was performed by the cross-linking agent contained in the ink jet printing ink thus coated, a printed material to be obtained has an excellent abrasion fastness.

JP-A-2013-176972 has disclosed a post-treatment liquid containing an urethane resin, a fluorine-based surfactant, an aqueous organic solvent, and water. The patent literature described above also has disclosed that when the above post-treatment liquid is ejected to cover an image forming portion obtained by forming an image on a recording medium using an ink, a recorded material to be obtained has an excellent image abrasion resistance.

However, the abrasion fastness of the ink jet printing ink disclosed in JP-A-2017-43681 is still further required to be improved. In addition, in the example of JP-A-2013-176972, the image abrasion resistance of the recorded material, which was obtained by ejection of the above post-treatment liquid on the image forming portion obtained by forming the image on offset printing paper using the ink, was evaluated. However, the case in which the post-treatment liquid disclosed in the above patent literature is used for an ink jet printing method has not been considered. When the post-treatment liquid is used for the printing, the abrasion fastness and the texture are still further required to be improved.

SUMMARY

An advantage of some aspects of the invention is to provide an ink jet printing clear ink composition, an ink jet printing ink set, and an ink jet printing method, each of which is able to improve the abrasion fastness without degrading a cloth texture.

Through intensive research carried out by the present inventors in order to solve the problems described above, the following was found. That is, it was found that in an ink jet printing clear ink composition containing resin particles, a lubricant, and water, when the resin particles include an urethane resin having a cross-linking group, and when the ink jet printing clear ink composition is formed into a dried coating film having a Young's modulus in a predetermined range, the ink jet printing clear ink composition can improve the abrasion fastness without degrading a cloth texture.

That is, an ink jet printing clear ink composition of the invention is as described below.

(1) An ink jet printing clear ink composition is an ink jet printing clear ink composition comprising: resin particles; a lubricant: and water, the resin particles includes an urethane resin having a cross-linking group, and the clear ink composition is formed into a dried coating film having a Young's modulus of 5 to 70 MPa.

(2) In the ink jet printing clear ink composition according to the above (1), the urethane resin having a cross-linking group has a polycarbonate skeleton.

(3) In the ink jet printing clear ink composition according to the above (1) or (2), the content of the resin particles with respect to the total mass of the clear ink composition is 7 to 20 percent by mass on a solid component basis.

(4) In the ink jet printing clear ink composition according to any one of the above (1) to (3), the lubricant has a melting point of 90° C. to 150° C.

(5) In the ink jet printing clear ink composition according to any one of the above (1) to (4), the content of the lubricant with respect to the total mass of the clear ink composition is 0.8 to 5 percent by mass on a solid component basis.

(6) In the ink jet printing clear ink composition according to any one of the above (1) to (5), the cross-linking group is at least one of a blocked isocyanate group and a silanol group.

(7) The ink jet printing clear ink composition according to any one of the above (1) to (6) further comprises a cross-linking agent, and the cross-linking agent is at least one selected from the group consisting of an isocyanate-based cross-linking agent, an oxazoline-based cross-linking agent, and a carbodiimide-based cross-linking agent.

(8) An ink jet printing ink set comprises: the ink jet printing clear ink composition according to any one of the above (1) to (7); and an ink jet printing color ink composition containing a pigment, resin particles, and water.

(9) In the ink jet printing ink set according to the above (8), the resin particles in the color ink composition include an urethane resin having a cross-linking group.

(10) In the ink jet printing ink set according to the above (8) or (9), the total of the content of the resin particles in the color ink composition and the content of the resin particles in the clear ink composition with respect to a solid component of the pigment in the color ink composition is 1.8 to 4.5 on a mass ratio basis.

(11) An ink jet printing method comprises: an image forming step of forming an image by ejecting the clear ink composition and the color ink composition of the ink jet printing ink set according to any one of the above (8) to (10) to a cloth using an ink jet recording apparatus.

(12) In the ink jet printing method according to the above (11), in the above image forming step, the clear ink composition and the color ink composition are simultaneously ejected.

(13) In the ink jet printing method according to the above (11) or (12), in the above image forming step, the clear ink composition and the color ink composition are ejected in the same scan.

(14) In the ink jet printing method according to any one of the above (11) to (13), an adhesion amount of the clear ink composition per unit area of the cloth with respect to an adhesion amount of the color ink composition per unit area of the cloth is 0.25 to 0.60 on a mass ratio basis.

(15) In the ink jet printing method according to any one of the above (11) to (14), an adhesion amount of the clear ink composition per unit area of the cloth is 10 to 40 g/m$^2$.

(16) The ink jet printing method according to any one of the above (11) to (15) further comprises a drying step of drying the image by heating, and the drying step is performed at a drying temperature of 120° C. or more.

BRIEF DESCRIPTION OF THE DRAWINGS

The invention will be described with reference to the accompanying drawing, wherein like numbers reference like elements.

FIGURE is a flowchart showing one example of a printing method of this embodiment.

DESCRIPTION OF EXEMPLARY EMBODIMENTS

Hereinafter, although an embodiment (hereinafter, referred to as "this embodiment") of the invention will be described in detail, if needed, with reference to the drawing, the invention is not limited thereto and may be variously modified and/or changed without departing from the scope of the invention.

In this specification, a "clear ink" is not an ink used for coloring a cloth but is an ink used for other purposes. As the other purposes, for example, an improvement in abrasion resistance or the like may be mentioned, but the purposes are not particularly limited.

Although the clear ink is not particularly limited as long as being used for the purposes described above, the content of a colorant with respect to the total mass of the ink is preferably 0.1 percent by mass or less and more preferably 0.08 percent by mass or less, and further preferably, the colorant is not contained.

In this specification, "printing" indicates that a clear ink composition and/or a color ink composition is recorded on a cloth, and a "printed material" indicates an image formed by recording a clear ink composition and/or a color ink composition on a cloth.

In this specification, "ink jet printing" indicates that at least one of a clear ink composition and a color ink composition is printed by an ink jet method.

In this specification, "head reliability" indicates characteristics in which even when a clear ink composition is filled in a head having at least one nozzle and is left for a predetermined period, the clear ink composition is normally ejected from the nozzle.

In this specification, "storage stability" indicates characteristics in which even when a clear ink composition is left in an atmosphere at approximately 50° C. for a predetermined period, the viscosity of the clear ink composition is not likely to be changed.

In this specification, an ink jet printing clear ink composition, an ink jet printing color ink composition, and an ink jet printing ink set are called a "clear ink composition", a "color ink composition", and an "ink set", respectively, in some cases.

Ink Jet Printing Clear Ink Composition

An ink jet printing clear ink composition of this embodiment contains resin particles, a lubricant, and water. The resin particles include an urethane resin having a cross-linking group. The clear ink composition is formed into a dried coating film having a Young's modulus of 5 to 70 MPa. Since the clear ink composition has the structure described above, the reasons the clear ink composition can improve the abrasion fastness without degrading the cloth texture are believed as described below. However, the reasons are not limited to those described below.

First, since the clear ink composition contains the urethane resin having a cross-linking group and the lubricant, and since the Young's modulus of the dried coating film of the clear ink composition is set in a specific range, the abrasion fastness is excellent without degrading the texture. In more particular, first, since the cross-linking group included in the urethane resin forms a cross-linking structure with a reactive group, such as a hydroxy group, in the cloth, fixing properties of the clear ink composition to the cloth are improved, and as a result, the clear ink composition is excellent in abrasion fastness and is particularly excellent in wet abrasion fastness. In this case, as disclosed in JP-A-2017-43681, it may also be conceived that in order to improve the abrasion fastness, an urethane resin and a cross-linking agent are used in combination. However, when the cross-linking agent is only used without using the urethane resin having a cross-linking group, besides degradation in storage stability of the clear ink composition, the abrasion fastness may also not be sufficiently improved in some cases. On the other hand, in the clear ink composition of this embodiment, since the urethane resin particles have a cross-linking group, the abrasion fastness is excellent without containing the cross-linking agent, and furthermore, the problem in that the storage stability is degraded by the presence of the cross-linking agent can be overcome. Furthermore, by the presence of the lubricant, slip characteristics are imparted to a printed portion, and the abrasion fastness, in particularly, dry abrasion fastness, can be improved. That is, on the surface of the cloth, since the urethane resin having a cross-linking group and the lubricant cooperatively function, the abrasion fastness can be improved. Furthermore, since the Young's modulus of the dried coating film of the clear ink composition is set to a predetermined value or more, the clear ink composition can further improve the abrasion fastness. On the other hand, since the Young's modulus of the dried coating film of the clear ink composition is set to a predetermined value or less, the dried coating film is not excessively hard, and the clear ink composition can suppress the cloth texture from being degraded.

Resin Particles

The clear ink composition of this embodiment contains resin particles. When the clear ink composition contains the resin particles, the abrasion fastness can be improved. A resin of the resin particles is an urethane resin having a cross-linking group. In this specification, the "cross-linking group" indicates a group capable of forming a cross-linking structure by a reaction, and a terminal group of the urethane resin is not included in the cross-linking group. Hereinafter, in this specification, the urethane resin having a cross-linking group is also referred to as a cross-linking group-containing urethane resin in some cases. Since the resin of the resin particles is an urethane resin, the clear ink composition can improve the abrasion fastness, the head reliability, and the storage stability. In addition, since the urethane resin has a cross-linking group, the clear ink composition can improve the wet abrasion fastness and the storage stability. The cross-linking group is not particularly limited as long as being allowed to react with an active hydrogen-containing group, such as a hydroxy group, containing active hydrogen in the cloth to form a bond therewith. As a particular example of the cross-linking group, for example, an isocyanate group and a silanol group may be mentioned. The isocyanate group functioning as a cross-linking group may be, for example, a blocked isocyanate group having a structure chemically protected by capping or blocking. The blocked isocyanate group is de-protected and activated by heating, and the activated isocyanate reacts with an active hydrogen-containing group, such as a hydroxy group, in the cloth to form a bond, such as an urethane bond, an urea bond, or an allophanate bond.

Among those cross-linking groups mentioned above, in order to further improve the abrasion fastness, at least one of a blocked isocyanate group and a silanol group is preferable, and in order to further improve the wet abrasion fastness, a blocked isocyanate group is more preferable.

In this specification, the urethane resin indicates a resin including an urethane bond, an urea bond, or an allophanate bond formed by a reaction between an isocyanate group and an active hydrogen-containing group, such as a hydroxy group, an amino group, or an urethane bond group, or a carboxyl group. As the urethane resin, there may be preferably used a polyether-based urethane resin, a polyester-based urethane resin, and a polycarbonate-based urethane resin, those resins having besides an urethane bond, an ether skeleton, a polyester skeleton, and a polycarbonate skeleton, respectively, as a main chain.

In order to increase the Young's modulus of the dried coating film of the clear ink composition, the cross-linking group-containing urethane resin of this embodiment is preferably a polycarbonate-based urethane resin having a polycarbonate skeleton or a polyester-based urethane resin having a polyester skeleton, and a polycarbonate-based urethane resin having a polycarbonate skeleton is more preferably used. The "polycarbonate skeleton" is preferably a skeleton represented by the following formula (1), and the "polyester skeleton" is preferably a skeleton represented by the following formula (2). In addition, according to JP-A-2013-176972 described above, as the urethane resin, an ether-based urethane resin is used. However, primarily due to a low 100% modulus of the ether-based urethane resin, the Young's modulus of the dried coating film of the clear ink composition is decreased, and the image abrasion resistance of a recorded material to be obtained is not sufficient.

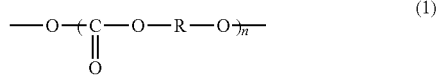

In the formula (1), R represents a linear, a branched, or a cyclic alkylene group; the above alkylene group may have an ether bond and/or an ester bond; and n indicates an integer of 1 or more.

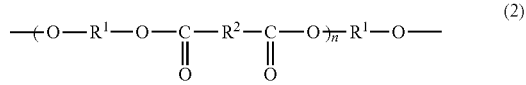

In the formula (2), $R^1$ and $R^2$ each independently represent a linear, a branched, or a cyclic alkylene group; the above alkylene group may have an ether bond and/or an ester bond; and n indicates an integer of 1 or more.

Since the viscosity can be further decreased, the cross-linking group-containing urethane resin is preferably in the form of emulsion, and as the type of emulsion, an emulsion polymerization type, a forced emulsion type, and a self-emulsion type may be mentioned.

The 100% modulus of the cross-linking group-containing urethane resin is preferably from 4 to 30 MPa. In addition, the 100% modulus described above is preferably from 5 to 25 MPa and more preferably from 6 to 20 MPa. When the 100% modulus is 4 MPa or more, since the clear ink composition has a preferable adhesion to fibers of the cloth functioning as a recording medium, a printed material having an excellent abrasion fastness can be obtained, and in addition, since the dispersibility of the ink composition is improved, the storage stability is improved. When the 100% modulus is 30 MPa or less, the dried coating film of the clear ink composition is not excessively hard, and the degradation in cloth texture tends to be further suppressed. The 100% modulus can be obtained, for example, by a measurement method in accordance with JIS K7161.

The average particle diameter of the resin particles may be approximately 10 to 300 nm. The average particle diameter of the resin particles is on a volume basis. As a measurement method, for example, measurement can be performed by a particle size distribution measurement device using a laser diffraction scattering method as a measurement principle. As the particle size distribution measurement device, for example, there may be mentioned a particle size distribution meter using a dynamic light scattering method as a measurement principle.

The cross-linking group-containing urethane resin may be either a preparation prepared by a known method or a commercially available product. As the commercially available products, for example, there may be mentioned "ETERNACOLL UW-1501F" manufactured by Ube Industries, Ltd.; "Trixene Series", such as "Trixene BI7986" and "Trixene BI7987" manufactured by Baxenden; "BayhydurBL2781" manufactured by Bayer; "Takenate WB Series" manufactured by Mitsui Chemicals Inc.; "Duranate WM44-L70G" manufactured by Asahi Kasei Corporation; "Turboset TM2025" manufactured by Lubrizol; and "Takelac WS Series", such as "Takelac WS-4022", "Takelac WS-5984" and "Takelac WS-5100" manufactured by Mitsui Chemicals Inc. As examples of the polycarbonate-based urethane resin, "ETERNACOLL UW-1501F" manufactured by Ube Industries, Ltd. and "Takelac WS-5100" manufactured by Mitsui Chemicals Inc. may be mentioned, and as examples of the polyester-based urethane resin, "Takelac WS-4022" and "Takelac WS-5984" may be mentioned. As examples of the resin having a blocked isocyanate group as the cross-linking group, "ETERNACOLL UW-1501F" manufactured by Ube Industries, Ltd.; "Trixene Series", such as "Trixene BI7986" and "Trixene BI7987" manufactured by Baxenden; "BayhydurBL2781" manufactured by Bayer; "Takenate WB Series" manufactured by Mitsui Chemicals Inc.; "Duranate WM44-L70G" manufactured by Asahi Kasei Corporation; and "Turboset TM2025" manufactured by Lubrizol may be mentioned, and as examples of the resin having a silanol group as the cross-linking group, "Takelac WS-4022", "Takelac WS-5984" and "Takelac WS-5100" manufactured by Mitsui Chemicals Inc. may be mentioned. Those cross-linking group-containing urethane resins may be used alone, or at least two types thereof may be used in combination. Among those urethane resins, since the Young's modulus of the dried coating film of the clear ink composition can be further improved, as the cross-linking group-containing urethane resin, at least one of "ETERNACOLL UW-1501F", "Takelac WS-4022", and "Takelac WS-5984" is preferably used.

In the clear ink composition of this embodiment, the content of the resin particles with respect to the total mass of the clear ink composition is preferably 7 to 20 percent by mass on a solid component basis. When the content of the resin particles is 7 percent by mass or more, the clear ink composition tends to further improve the wet abrasion fastness. When the content of the resin particles is 20 percent by mass or less, the clear ink composition can further suppress the cloth texture from being degraded and, at the same time, tends to further improve the head reliability and the storage stability. From the same point as described above, the lower limit of the content of the resin particles is more preferably 10 percent by mass and further preferably 12 percent by mass, and the upper limit of the content of the resin particles is more preferably 15 percent by mass and further preferably 13 percent by mass.

Lubricant

The clear ink composition of this embodiment contains a lubricant. In this specification, the lubricant indicates an additive used to reduce the friction between fibers. Since the clear ink composition contains the lubricant, the slip characteristics are imparted to a printed portion, and hence, the dry abrasion fastness can be improved. In addition, since the clear ink composition contains the lubricant, collision between the resin particles is suppressed, and the head reliability can be improved. The lubricant may be a compound having a hydrophilic portion and a hydrophobic portion and may be in the form of particles, and by the use of the lubricant as described above, the lubricant is selectively oriented on the surface of the coating film, and as a result, various functions, such as the slip characteristics, hydrophobic characteristics, and the like, may be obtained. The lubricant as described above is not particularly limited, and for example, there may be mentioned calcium stearate, ammonium stearate, a silicone-based wax, a fluorine-based wax, a microcrystalline wax, a polyethylene wax, a paraffin wax, carnauba wax, and a polyethylene-paraffin wax. Those lubricants may be used alone, or at least two types thereof may be used in combination.

Among those lubricants mentioned above, since the operational advantage of the invention can be effectively and reliably obtained, as the lubricant, a polyethylene wax, a polyethylene-paraffin wax, a paraffin wax, and carnauba wax are preferable. The lubricant may be either an oxide or a derivative thereof to which a functional group is introduced, such as a carboxyl group. In addition, since the viscosity can be further decreased, the lubricant is preferably in the form of emulsion, and as the type of emulsion, for example, there may be mentioned an emulsion polymerization type, a forced emulsion type, and a self-emulsion type.

In this embodiment, the lubricant preferably has a melting point of 90° C. to 150° C. When the melting point of the lubricant is 90° C. or more, the clear ink composition of this embodiment tends to further improve the dry abrasion fastness, the head reliability, and the storage stability. When the melting point of the lubricant is 150° C. or less, the dry abrasion fastness tends to be further improved. From the same point as described above, the lower limit of the melting point of the lubricant is more preferably 100° C. and further preferably 105° C., and the upper limit of the melting point of the lubricant is more preferably 150° C. and further preferably 140° C.

In this embodiment, the content of the lubricant with respect to the total mass of the clear ink composition is preferably 0.8 to 10 percent by mass on a solid component basis and more preferably 0.8 to 5 percent by mass. When the content of the lubricant is 0.8 percent by mass or more, the clear ink composition of this embodiment further suppresses the degradation in cloth texture and, at the same time, tends to further improve the dry abrasion fastness. When the content of the lubricant is 10 percent by mass or less, the clear ink composition of this embodiment tends to further improve the head reliability and the ink storage stability. From the same point as described above, the lower limit of the content of the lubricant is more preferably 1.0 percent by mass and further preferably 1.2 percent by mass, and the upper limit of the content of the lubricant is more preferably 4.0 percent by mass and further preferably 2.0 percent by mass.

Water

The clear ink composition of this embodiment contains water. The water is not particularly limited, and for example, there may be mentioned pure water and ultrapure water, such as ion-exchanged water, ultrafiltration water, reverse osmosis water, and distilled water.

The content of the water with respect to the total mass of the clear ink composition may be, for example, approximately 30 to 80 percent by mass.

Cross-Linking Agent

The clear ink composition of this embodiment may contain a cross-linking agent. As the cross-linking agent, for example, an isocyanate-based cross-linking agent, an oxazoline-based cross-linking agent, and a carbodiimide-based cross-linking agent may be mentioned. Those cross-linking agents may be used alone, or at least two types thereof may be used in combination.

As the isocyanate-based cross-linking agent, there may be mentioned a compound having at least two isocyanate groups in one molecule may be mentioned. As a particular example of the isocyanate-based cross-linking agent, an aliphatic polyisocyanate, an alicyclic polyisocyanate, an aromatic polyisocyanate, and a derivative thereof may be mentioned. As the isocyanate-based cross-linking agent, a commercially available product may also be used, and as the commercially available product, for example, "Takenate WB-3936" and "Takenate WB-3021" manufactured by Mitsui Chemicals Inc. may be mentioned.

As the oxazoline-based cross-linking agent, for example, there may be mentioned a polymer obtained by homopolymerization of an oxazoline group-containing unsaturated monomer, such as 2-isopropenyl-2-oxazoline or 2-vinyl-2-oxazoline, or a copolymer obtained by copolymerization of the monomer mentioned above and another unsaturated monomer. As the oxazoline-based cross-linking agent, a commercially available product may also be used, and as the commercially available product, for example, "Epocros WS500" and "Epocros K201E" manufactured by Nippon Shokubai Co., Ltd. may be mentioned.

As the carbodiimide-based cross-linking agent, a compound containing at least two carbodiimide groups in one molecule may be mentioned. As the carbodiimide-based cross-linking agent, a commercially available product may also be used, and as the commercially available product, for example, "Carbodilite V-02" manufactured by Nisshinbo may be mentioned.

The content of the cross-linking agent with respect to the total mass of the clear ink composition is preferably 2 to 10 percent by mass on a solid component basis, more preferably 3 to 7 percent by mass, and further preferably 3 to 5 percent by mass. In addition, the content of the cross-linking agent with respect to the solid component amount of the resin is preferably 0.3 to 0.7 and more preferably 0.3 to 0.5. When the content of the cross-linking agent is in the range described above, the clear ink composition tends to further improve the wet abrasion fastness. In addition, since the clear ink composition of this embodiment can improve the abrasion fastness without containing the cross-linking agent, in order to improve the head reliability and the storage stability, the cross-linking agent is preferably not contained.

Aqueous Organic Solvent

In view of viscosity adjustment and moisturizing function, the clear ink composition of this embodiment may further contain a water-soluble aqueous organic solvent.

Although the aqueous organic solvent is not particularly limited, for example, there may be mentioned a lower alcohol, such as methanol, ethanol, 1-propanol, isopropyl alcohol, 1-butanol, 2-butanol, isobutanol, or 2-methyl-2-propanol; a glycol, such as ethylene glycol, diethylene glycol, triethylene glycol, tetraethylene glycol, pentaethylene glycol, propylene glycol, dipropylene glycol, or tripropylene glycol; glycerin; an acetin, such as monoacetin, diacetin, or triacetin; a glycol derivative, such as triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, or tetraethylene glycol diethyl ether; 1-methyl-2-pyrrolidone, β-thiodiglycol, or sulfolane. Those aqueous organic solvents may be used alone, or at least two types thereof may be used in combination.

In order to effectively and reliably obtain the operational advantage of the invention, the content of the aqueous organic solvent with respect to the total mass of the clear ink composition is preferably 1.0 to 50 percent by mass, more preferably 5.0 to 40 percent by mass, and further preferably 10 to 30 percent by mass.

Organic Alkali and Inorganic Alkali

While the operational advantage of the invention is effectively and reliably obtained, in order to improve the storage stability and the ejection stability, the clear ink composition of this embodiment preferably contains an organic alkali and/or an inorganic alkali.

The organic alkali is not particularly limited, and for example, an amine, such as piperidine, diethanolamine, triethanolamine, propanolamine, or morpholine, and a denatured material thereof may be mentioned.

The content of the organic alkali with respect to the total mass of the clear ink composition may be approximately 0.1 to 2.0 percent by mass.

The inorganic alkali is not particularly limited, and for example, there may be mentioned a metal hydroxide, such as potassium hydroxide, sodium hydroxide, or lithium hydroxide; an ammonium salt, such as ammonium hydroxide or quaternary ammonium hydroxide; a carbonate, such as potassium carbonate, sodium carbonate, or lithium carbonate; or a phosphate.

The content of the inorganic alkali with respect to the total mass of the clear ink composition may be approximately 0.01 to 0.5 percent by mass.

Surfactant

In order to stably eject the ink composition by an ink jet method, and in addition, in order to appropriately control the permeation of the ink composition, the clear ink composition of this embodiment may further contain a surfactant. The surfactant is not particularly limited, and for example, there may be mentioned an acetylene glycol-based surfactant, a fluorine-based surfactant, and a silicone-based surfactant. As the acetylene glycol-based surfactant, for example, there may be mentioned 2,4,7,9-tetramethyl-5-decyne-4,7-diol and an alkylene oxide adduct of 2,4,7,9-tetramethyl-5-decyne-4,7-diol, and 2,4-dimethyl-5-decyne-4-ol and an alkylene oxide adduct of 2,4-dimethyl-5-decyne-4-ol. As the fluorine-based surfactant, for example, there may be mentioned a perfluoroalkyl sulfonate, a perfluoroalkyl carbonate, a perfluoroalkyl phosphate ester, a perfluoroalkyl ethylene oxide adduct, a perfluoroalkyl betaine, and a perfluoroalkyl amine oxide compound. As the silicone-based surfactant, for example, there may be mentioned a polysiloxane-based compound and a polyether modified organosiloxane. Those surfactants may be used alone, or at least two types thereof may be used in combination.

In order to effectively and reliably obtain the operational advantage of the invention, the content of the surfactant with respect to the total mass of the clear ink composition may be, for example, approximately 0.1 to 1.0 percent by mass.

The dried coating film of the clear ink composition of this embodiment has a Young's modulus of 5 to 70 MPa. When the Young's modulus is 5 MPa or more, the clear ink composition can improve the abrasion fastness and, in particular, the wet abrasion fastness, and when the Young's modulus is 70 MPa or less, the dried coating film is not excessively hard, and the clear ink composition can suppress the degradation in texture. From the same point as described above, the lower limit of the Young's modulus is preferably 6 MPa and more preferably 10 MPa, and the upper limit of the Young's modulus is preferably 65 MPa and more preferably 60 MPa. The Young's modulus can be controlled in the range described above by appropriately adjusting the type and the content of each component contained in the clear ink composition, and in particular, by appropriately adjusting the type and the content of the resin particles. The Young's modulus can be obtained, for example, by a measurement method in accordance with JIS K7161.

As described above, when the Young's modulus of the dried coating film is increased, although the wet abrasion fastness tends to be improved, a sufficient texture and dry abrasion fastness may not be obtained in some cases. On the other hand, since the clear ink composition of this embodiment contains the lubricant as described above, the Young's modulus of the dried coating film is not excessively increased and is likely to be controlled in a preferable range; hence, as a result, the abrasion fastness can be improved without degrading the texture.

In this specification, the dried coating film of the clear ink composition indicates a film obtained by drying the clear ink composition. The dried coating film is a film formed by the following method. That is, after a frame having a sufficient height is provided on a flat substrate of a metal or a glass to form a rectangular recess opening having a size of 3×19 cm, 10 g of the ink composition is charged inside the frame. After being dried in an air atmosphere over one night, the ink composition is heated at 160° C. for 15 minutes and is then cooled down to room temperature. Next, after it is confirmed that the weight is not changed, the ink coating film is peeled away from the substrate. The film thus obtained is called the dried coating film.

The clear ink composition of this embodiment preferably has a viscosity of 4.0 to 6.0 mPa·s at 25° C. Since the viscosity is in the range described above, the clear ink composition tends to further improve the head reliability. From the same point as described above, the lower limit of the viscosity is more preferably 4.5 mPa·s and further preferably 5.0 mPa·s, and the upper limit of the viscosity is more preferably 5.9 mPa·s and further preferably 5.8 mPa·s. The viscosity is a value measured by a viscoelasticity measurement device MCR-300 (product name) manufactured by Pysica. In particular, the viscosity is obtained in such a way that after the temperature of the clear ink composition is controlled to 25° C., while the shear rate is increased from 10 to 1,000, the viscosity is read when the shear rate is 200.

The clear ink composition of this embodiment is used for ink jet printing. A coating method of coating the clear ink composition to a cloth is not particularly limited. As the coating method, for example, there may be used ink jet coating in which the clear ink composition is coated on a cloth by an ink jet method or padding coating in which the clear ink composition is coated on a cloth by a padding method. Among those mentioned above, since the degradation in texture can be further suppressed, the ink jet coating is preferable. In addition, since a necessary ink amount and an amount of waste liquid are smaller that those of the padding method, the ink jet coating is also preferable in view of save energy and reduction in environmental load. In addition, since the process can be simplified, the ink jet coating is also preferable in view of the productivity.

Ink Jet Printing Ink Set

An ink jet printing ink set of this embodiment includes the ink jet printing clear ink composition of this embodiment and an ink jet printing color ink composition.

Ink Jet Printing Color Ink Composition

The ink jet printing color ink composition includes a pigment, resin particles, and water.

Pigment

The pigment of this embodiment is not particularly limited, and for example, the following may be mentioned.

Carbon black used for a black ink is not particularly limited, and for example, there may be mentioned No. 2300, No. 900, MCF88, No. 33, No. 40, No. 45, No. 52, MA7, MA8, MA100, and No. 2200B(manufactured by Mitsubishi Chemical Corporation); Raven 5750, Raven 5250, Raven 5000, Raven 3500, Raven 1255, and Raven 700(manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (manufactured by Degussa).

A pigment used for a white ink is not particularly limited, and for example, there may be mentioned C.I. Pigment White 6, 18, and 21, titanium oxide, zinc oxide, zinc sulfide, antimony oxide, zirconium oxide, and while hollow resin particles and high molecular weight particles.

A pigment used for a yellow ink is not particularly limited, and for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A pigment used for a magenta ink is not particularly limited, and for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

A pigment used for a cyan ink is not particularly limited, and for example, there may be mentioned C.I. Pigment Blue 1, 2, 3, 15, 15:1, 15:2, 15:3, 15:34, 15:4, 16, 18, 22, 25, 60, 65, and 66, and C.I. Vat Blue 4 and 60.

A pigment other than those mentioned above is not particularly limited, and for example, there may be mentioned C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

The average particle diameter of the pigment may be approximately 50 to 300 nm. As a method for measuring the average particle diameter of the pigment, for example, there may be used a particle size distribution measurement device using a laser diffraction scattering method as a measurement principle. As the particle size distribution measurement device, for example, a particle size distribution meter using a dynamic light scattering method as a measurement principle may be mentioned.

In the ink composition, the content of the pigment with respect to the total (100 percent by mass) of the ink composition may be, for example, approximately 1.0 to 15 percent by mass.

Resin Particles

A resin of the resin particles is not particularly limited, and for example, there may be mentioned a (meth)acryl resin, a styrene-acryl resin, a fluorene resin, an urethane resin, a polyolefin resin, a rosin modified resin, a terpene resin, a polyester resin, a polyamide resin, an epoxy resin, a vinyl chloride resin, a vinyl chloride-vinyl acetate copolymer, and an ethylene-vinyl acetate resin. Those resins may be used alone, or at least two types thereof may be used in combination. Among the resins of the resin particles mentioned above, since being not likely to be peeled away from the dried coating film of the clear ink composition, an urethane resin is preferable, and an urethane resin having a cross-linking group is more preferable.

The urethane resin is a resin having an urethane bond in its molecule. As the urethane resin, there may be mentioned a polyether-based urethane resin, a polyester-based urethane resin, and a polycarbonate-based urethane resin, those resins having besides an urethane bond, an ether skeleton, a polyester skeleton, and a polycarbonate skeleton, respectively, as a main chain.

As the cross-linking group, the cross-linking group described by way of example in the above "ink jet printing clear ink composition" may be mentioned. As a preferable cross-linking group, the cross-linking group described by way of example in the above "ink jet printing clear ink composition" as a preferable cross-linking group may be mentioned.

The total of the content of the resin particles in the color ink composition and the content of the resin particles in the clear ink composition is, with respect to the solid component of the pigment in the color ink composition, preferably 1.5 to 4.5 on a mass ratio basis and more preferably 1.8 to 4.5. When the mass ratio of the total is 1.5 or more, the ink set tends to further improve the wet abrasion fastness. In addition, the mass ratio of the total is 4.5 or less, the ink set can further suppress the degradation in cloth texture and, in addition, tends to further improve the head reliability and the storage stability. From the same point as described above, the lower limit of the mass ratio of the total is more preferably 2.0 and further preferably 2.4, and the upper limit of the mass ratio of the total is more preferably 4.4, further preferably 3, and even further preferably 2.5.

Water

The color ink composition of this embodiment contains water. As the water, the water described by way of example in the "clear ink composition" may be mentioned. In addition, as the numerical range of the content of the water, the numerical range of the content of the water described by way of example in the "clear ink composition" may be described as an example.

Aqueous Organic Solvent

In view of the viscosity adjustment and the moisturizing function, the color ink composition of this embodiment may further contain a water-soluble aqueous organic solvent. As the aqueous organic solvent, the aqueous organic solvent described by way of example in the "clear ink composition" may be mentioned. In addition, as the numerical range of the content of the aqueous organic solvent, the numerical range of the content of the aqueous organic solvent described by way of example in the "clear ink composition" may be described as an example.

pH Adjuster

In order to further improve glossy feeling, the color ink composition of this embodiment may further contain a pH adjuster. As the pH adjuster, for example, there may be mentioned a hydroxide of an alkali metal, such as lithium hydroxide, potassium hydroxide, or sodium hydroxide; or an amine, such as ammonium, triethanolamine, a tripropanolamine, diethanolamine, or monoethanolamine. Those pH adjusters may be used alone, or at least two types thereof may be used in combination.

The content of the pH adjuster is not particularly limited, and for example, with respect to the total mass of the color ink composition, the content may be approximately 0.1 to 1.0 percent by mass.

Surfactant

In order to stably eject the ink composition by an ink jet method and to appropriately control the permeation of the ink composition, the color ink composition of this embodiment may further contain a surfactant. As the surfactant, the surfactant described by way of example in the "clear ink composition" may be mentioned. In addition, as the numerical range of the content of the surfactant, the numerical range of the content of the surfactant described by way of example in the "clear ink composition" may be described as an example.

Ink Jet Printing Method

An ink jet printing method of this embodiment is an ink jet printing method including an image forming step of forming an image by ejecting the clear ink composition and/or the color ink composition of the ink jet printing ink set of this embodiment onto a cloth using an ink jet recording apparatus including a carriage mounting a head which has a plurality of nozzle lines. In the image forming step, the clear ink composition and the color ink composition may be simultaneously ejected from different nozzle lines of the head mounted in the carriage. FIGURE is a flowchart showing one example of the ink jet printing method of this embodiment. As shown in FIGURE, the ink jet printing method of this embodiment may further include, besides the above image forming step, the following pre-treatment step, heating step, and washing step.

Cloth

A cloth of this embodiment is not particularly limited, and for example, there may be mentioned natural fibers, such as silk, cotton, and wool, and synthetic fibers, such as nylon, polyester, and rayon, may be mentioned. The cloth may be formed from one type of fibers or at least two types of fibers mixed in combination. Among those mentioned above, in particular, when at least two types of fibers having different permeations are used in combination by mixing, the advantage of this embodiment tends to be more easily obtained. As the cloth, any one of a woven cloth, a knit cloth, and a non-woven cloth, each of which is formed from the fibers mentioned above, may be used.

Since the ink jet printing method of this embodiment includes the above image forming step, without degrading the cloth texture, printing which improves the abrasion fastness can be performed. In addition, in the ink jet printing method of this embodiment, a step of further coating the clear ink composition to a cloth to which the color ink composition is adhered by a padding method or the like is not required, and hence, the productivity is excellent.

The above ink jet printing method is a printing method using the clear ink composition and/or the color ink composition charged in an ink jet apparatus. As the above ink jet apparatus, any ink jet apparatus may be used as long as including a carriage mounting a head having a plurality of nozzle lines, and for example, a drop-on-demand type ink jet apparatus may be mentioned. As this drop-on-demand type ink jet apparatus, for example, there may be mentioned an apparatus which employs an ink jet printing method using a piezoelectric element disposed in the head or an apparatus which employs an ink jet printing method using thermal energy by a heat generating resistance element, such as a heater, disposed in the head, and any one of those apparatuses described above may be used. Hereinafter, the steps of the ink jet printing method each will be described in detail.

Pre-Treatment Step

In order to improve an ink chromogenic property and image quality, before the image forming step is performed, the ink jet printing method of this embodiment may have a pre-treatment step of adhering a pre-treatment liquid to the cloth. By the pre-treatment step, an effect of improving the abrasion fastness by the clear ink composition is further enhanced, and hence, the pre-treatment step is preferably performed. The pre-treatment liquid contains, for example, water and a reactive agent which agglomerates components, such as the pigment and the resin, of the color ink composition or which increases the viscosity thereof. As the reactive agent, for example, a polyvalent metal salt, an organic acid, and a cationic compound may be mentioned. The rate of the reactive agent in the pre-treatment liquid with respect to the total mass of the pre-treatment liquid may be approximately 1 to 20 percent by mass. As a method for adhering the pre-treatment liquid to the cloth in the pre-treatment step, for example, there may be mentioned a method in which the cloth is immersed in the pre-treatment liquid, a method in which the pre-treatment liquid is coated on the cloth by a blade or a brush, a method in which the pre-treatment liquid is sprayed, and a method in which the pre-treatment liquid is coated on the cloth using an ink jet recording apparatus. An adhesion amount of the pre-treatment liquid to the cloth is not particularly limited, and for example, the adhesion amount may be approximately 2 to 20 mg/inch$^2$.

Image Forming Step

The image forming step of this embodiment forms an image on the cloth by ejecting the clear ink composition and the color ink composition of the ink set of this embodiment using the ink jet recording apparatus described above. In this case, the image is preferably formed by ejecting at least the color ink composition to the cloth by the ink jet recording apparatus described above, and the image is more preferably formed by ejecting both the clear ink composition and the color ink composition of the ink set of this embodiment to the cloth by the ink jet recording apparatus described above. As a coating method of coating the clear ink composition to the cloth other than the ink jet method, a method may be mentioned in which the clear ink composition is coated by a padding method on the cloth on which the color ink composition is adhered. Since the adhesion amount of the ink composition to the cloth and the adhesion place thereof can be appropriately adjusted, and since the degradation in texture caused by an excessively large amount of the ink composition coated on the cloth can be suppressed, coating by the ink jet method is preferable. In the image forming step, the clear ink composition and the color ink composition are preferably simultaneously ejected from different nozzle lines of the head mounted in the carriage. In the image forming step of this embodiment, since the clear ink composition and the color ink composition are simultaneously ejected from the different nozzle lines, the amount of the clear ink composition coated on the cloth can be appropriately controlled so as not to be excessively increased. As a result, the image forming step of this embodiment can suppress the degradation in texture caused by an excessively large amount of the clear ink composition coated on the cloth. In this case, the "simultaneously" is not required to be exactly the same time as long as being within a time span in which a layer can be formed on the cloth by mixing the clear ink composition and the color ink composition. The time span in which the mixed layer can be formed is preferably one second or less, more preferably 0.8 seconds or less, and further preferably 0.5 seconds or less. In addition, in the case in which the ink jet recording apparatus is a serial printer, when the carriage mounting the head is scanned in a unit region to form an image, the clear ink composition and the color ink composition both may be ejected in the unit region. That is, when the ejection of the clear ink composition and the ejection of the color ink composition are performed while the carriage is scanned in the unit region, those ejections are regarded as the "simultaneous ejection". In this case, the "unit region" indicates one pixel or one band, and if needed, as various regions, the unit region may be set. In addition, the one pixel indicates one pixel corresponding to the resolution, and the one band indicates a region of an image formed by one carriage scan. That is, the ejections performed while the carriage is scanned once can be regarded as the "simultaneous ejection".

The adhesion amount of the clear ink composition per unit area of the cloth is preferably 0.25 to 0.60 on a mass ratio basis with respect to the adhesion amount of the color ink composition per unit area of the cloth. When the adhesion amount is 0.25 or more, the wet abrasion fastness tends to be further improved, and when the adhesion amount is 0.60 or less, the degradation in texture is further suppressed, and in addition, bleeding tends to be further suppressed. From the same point as described above, the lower limit of the adhesion amount is more preferably 0.28 and further preferably 0.30, and the upper limit of the adhesion amount is more preferably 0.55 and further preferably 0.50.

The adhesion amount of the clear ink composition per unit area of the cloth is preferably 10 to 40 g/m$^2$. When the adhesion amount is 10 g/m$^2$ or more, the wet abrasion fastness tends to be further improved, and when the adhesion amount is 40 g/m$^2$ or less, the degradation in texture is further suppressed, and in addition, the bleeding tends to be further suppressed. From the same point as described above, the lower limit of the adhesion amount is preferably 10 g/m$^2$, and the upper limit of the adhesion amount is preferably 38 g/m$^2$ and more preferably 35 g/m$^2$.

A coating region of the clear ink composition and a coating region of the color ink composition are preferably at least partially overlapped with each other. In addition, when coating is performed by an ink jet method, a dot formed by the clear ink composition and a dot formed by the color ink composition are preferably at least partially overlapped with each other. Since the clear ink composition and the color ink composition are overlapped with each other on the cloth, the abrasion fastness can be improved.

In addition, when coating is performed by an ink jet method, the order of coating the clear ink composition and the color ink composition to the cloth may not be particularly limited. In particular, when the clear ink composition and the color ink composition are simultaneously ejected, the order of adhering the clear ink composition and the color ink composition to the cloth is not limited. That is, in a reciprocal movement of the carriage, the coating order in a forward movement and the coating order in a backward movement may be opposite to each other.

Heating Step

The ink jet printing method of this embodiment may further include, after the image forming step is performed, a heating step of heating the cloth to which the clear ink composition and the color ink composition are adhered. When the ink jet printing method includes the heating step, the pigment can be more preferably fixed to fibers forming the cloth. The heating step is not particularly limited, and for example, a high temperature steaming method (HT method), a high pressure steaming method (HP method), or a thermosol method may be mentioned.

In addition, in the heating step, a pressure application step may be or may not be performed on a surface of a recording medium to which the clear ink composition and the color ink composition are adhered. As a heating method without performing the pressure application step on the surface of the recording medium to which the clear ink composition and the color ink composition are adhered, oven drying may be mentioned. In addition, a heating method which also performs the pressure application step on the surface of the cloth to which the clear ink composition and the color ink composition are adhered is not particularly limited, and for example, heat press or wet on dry may be mentioned. In this case, the "pressure application" indicates that the pressure is applied to the cloth by bringing a solid material into contact therewith.

The temperature of a heat treatment may be, for example, a temperature at which a cross-linking reaction of the cross-linking group included in the urethane resin of the clear ink composition can be started and is preferably 120° C. or more. When the temperature of the heat treatment is 120° C. or more, the abrasion fastness tends to be further improved. From the same point as described above, the temperature of the heat treatment is more preferably 140° C. or more and further preferably 160° C. or more. On the other hand, in order to further suppress the degradation in texture, the temperature of the heat treatment is more preferably 200° C. or less and is further preferably 180° C. or less. In this case, the temperature at which the cross-linking reaction of the cross-linking group can be started may be measured, for example, by analyzing the change with time of a peak intensity derived from the isocyanate group and the change with time of a peak intensity derived from a block group derived from a blocking agent using a real time FT-IR analysis manufactured by Thermo Fisher Scientific.

A drying time of the heat treatment is not particularly limited, and for example, the time may be approximately 1 to 10 minutes.

Washing Step

The ink jet printing method of this embodiment may further include, after the heating step is performed, a washing step of washing the cloth to which the clear ink composition and the color ink composition are adhered. By the washing step, a pigment not dyeing the fibers can be effectively removed. Washing in the washing step may be performed, for example, using water, and if needed, a soaping treatment may also be performed. The soaping treatment is not particularly limited, and for example, a method for removing an unfixed pigment using a hot soap liquid or the like by washing may be mentioned.

As described above, a printed material in which the image derived from the color ink composition is formed on the cloth can be obtained.

EXAMPLES

Hereinafter, the invention will be described in detail with reference to Examples. However, the invention is not limited to the following Examples.

Materials of Clear Ink Composition and Color Ink Composition

Main materials of a clear ink composition and a color ink composition used for the formation of the following printed material are as follows.

Resins

Resin A: urethane resin having a cross-linking group; product name "ETERNACOLL UW-1501F" manufactured by Ube Industries, Ltd., aqueous polycarbonate-based polyurethane resin dispersion containing 30 percent by mass of a solid component Resin B: urethane resin having a cross-linking group; product name "Takelac WS-5984" manufactured by Mitsui Chemicals Inc., aqueous polyester-based polyurethane resin dispersion containing 40 percent by mass of a solid component Resin C: urethane resin having a cross-linking group; product name "Takelac WS-4022", manufactured by Mitsui Chemicals Inc., aqueous polyester-based polyurethane resin dispersion containing 30 percent by mass of a solid component Resin D: urethane resin having a cross-linking group; product name "Turboset (registered trade name) 2025" manufactured by Lubrizol, urethane resin dispersion containing 36 percent by mass of a solid component Resin E: urethane resin having a cross-linking group; product name "Takelac WS-6021", manufactured by Mitsui Chemicals Inc., aqueous ether-based polyurethane resin dispersion containing 30 percent by mass of a solid component Resin F: urethane resin having no cross-linking group; product name "Hydran WLS-213", manufactured by DIC Corporation, aqueous polycarbonate-based polyurethane resin dispersion containing 35 percent by mass of a solid component Resin G: acryl resin having a cross-linking group; product name "Mowinyl 966A", manufactured by Japan Coating Resin Co., Ltd., aqueous styrene-acryl resin dispersion containing 45 percent by mass of a solid component Lubricant "Hytec E-9015" (product name, manufactured by Toho Chemical Industry Co., Ltd.): polyethylene wax having 40 percent by mass of a solid component and a melting point of 137° C.

"Hytec E-8237" (product name, manufactured by Toho Chemical Industry Co., Ltd.): polyethylene wax having 40 percent by mass of a solid component and a melting point of 106° C.

"Aquacer593 (product name, manufactured by BYK): polypropylene wax having 30 percent by mass of a solid component and a melting point of 160° C.

"Aquacer497 (product name, manufactured by BYK): paraffin wax having 50 percent by mass of a solid component and a melting point of 60° C.

Cross-Linking Agent

EpocrosK-2010E (product name, manufactured by Nippon Shokubai Co., Ltd.): oxazoline-based cross-linking agent having 40 percent by mass of a solid component Organic Solvent glycerin
triethylene glycol
triethylene glycol monobutyl ether Organic Alkali triethanolamine Inorganic Alkali sodium hydroxide Surfactant BYK-348 (product name, manufactured by BYK): siloxane-based surfactant Water ion-exchanged water Material of Color Ink Composition Pigment As the pigment, a cyan pigment dispersion obtained by the following preparation method was used.

After 65 parts by mass of C.I. Pigment Blue 15: 3 as a cyan pigment, 35 parts by mass of Joncryl611 (product name, manufactured by BASF Japan Ltd.) which was a styrene-acrylic acid-based dispersion resin, 1.70 parts by mass of potassium hydroxide, and 250 parts by mass of ultrapure water which was purified by an ion-exchange method and a reverse osmosis method were mixed together and were then dispersed for 10 hours by a ball mill using zirconia beads, filtration was performed using a glass fiber filter GA-100 (product name, manufactured by Advantech Toyo Kaisha, Ltd.) to remove large and coarse particles, and the concentration of a pigment solid component was controlled to 15 percent by mass, so that a cyan pigment dispersion was obtained.

Resins

Resin A: urethane resin having a cross-linking group; product name "ETERNACOLL UW-1501F" manufactured by Ube Industries, Ltd., aqueous polycarbonate-based polyurethane resin dispersion containing 30 percent by mass of a solid component Resin F: urethane resin having no cross-linking group; product name "Hydran WLS-213", manufactured by DIC Corporation, aqueous polycarbonate-based polyurethane resin dispersion containing 35 percent by mass of a solid component Organic Solvent glycerin
triethylene glycol
triethylene glycol monobutyl ether pH Adjuster triethanolamine Surfactant BYK-348 (product name, manufactured by BYK): siloxane-based surfactant Water ion-exchanged water Preparation of Clear Ink Composition and Color Ink Composition The individual materials were mixed together to have compositions shown in the following Tables 1 and 2 and were then sufficiently stirred, so that clear ink compositions E1 to E17 and C1 to C9 and color ink compositions 1 and 2 were obtained. In the following Tables 1 to 3, the unit of the numeral value indicates percent by mass, and the total indicates 100.0 percent by mass. The viscosities shown in Tables 1 and 2 are each a value measured at a shear rate of 200 (1/s) using a viscoelastic measurement device MCR-300 manufactured by Pysica after the temperature of the clear ink composition was set to 25° C.

Formation of Dried Coating Film of Clear Ink Composition

After a frame formed of a silicone rubber (thickness: 5 mm) was provided on a stainless steel (SUS)-made flat plate, and 10 g of the clear ink composition prepared as described above was charged in an opening having a size of 3 cm×19 cm and was then dried in an air atmosphere over one night. After a heat treatment was performed at 160° C. for 15 minutes, and the temperature was decreased to room temperature, it was confirmed that the weight was not changed, so that a coating film was obtained on the SUS plate. Furthermore, the coating film was peeled away from the SUS plate, so that a dried coating film was obtained.

Young's Modulus of Dried Coating Film of Clear Ink Composition

A stress-strain curve of the dried coating film thus obtained was measured using TENSILON Universal Testing Machine (product name: RTG-1250, manufactured by A&D Company, Ltd.) under the conditions in that the width of a test piece was 10 mm, the height thereof was 30 mm, and a tension rate was 100 mm/min. By linear regression between 0.05% to 0.25% of the strain of the stress-strain curve, the Young's modulus [MPa] was obtained. In addition, the thickness of the dried coating film necessary for this measurement was obtained by actual measurement using a micrometer (product name: "MDH-25M", manufactured by Mitutoyo Corporation). The Young's moduli of the dried coating films of the clear ink compositions are shown in Tables 1 and 2.

TABLE 1

|   |   |   | E1 | E2 | E3 | E4 | E5 | E6 |
|---|---|---|---|---|---|---|---|---|
| RESIN PARTICLES | RESIN A | CROSS-LINKING GROUP-CONTAINING URETHANE | 40.0 | 40.0 | 40.0 | 40.0 | 40.0 | 40.0 |

TABLE 1-continued

|  |  |  |  |  |  |  |  |
|---|---|---|---|---|---|---|---|
|  | RESIN B | CROSS-LINKING GROUP-CONTAINING URETHANE | — | — | — | — | — | — |
|  | RESIN C | CROSS-LINKING GROUP-CONTAINING URETHANE | — | — | — | — | — | — |
|  | RESIN D | CROSS-LINKING GROUP-CONTAINING URETHANE | — | — | — | — | — | — |
|  | RESIN E | CROSS-LINKING GROUP-CONTAINING URETHANE | — | — | — | — | — | — |
|  | RESIN F | CROSS-LINKING GROUP-NONCONTAINING URETHANE | — | — | — | — | — | — |
|  | RESIN G | CROSS-LINKING GROUP-CONTAINING ACRYL | — | — | — | — | — | — |
| LUBRICANT | HYTEC E-9015 | | 3.0 | — | 2.0 | 10.0 | 1.5 | 15.0 |
|  | HYTEC E-8237 | | — | 3.0 | — | — | — | — |
|  | AQUACER 593 | | — | — | — | — | — | — |
|  | AQUACER 497 | | — | — | — | — | — | — |
| CROSS-LINKING AGENT | EPOCROS K2010E | | — | — | — | — | — | — |
| ORGANIC SOLVENT | GLYCERIN | | 11.0 | 11.0 | 11.0 | 11.0 | 11.0 | 11.0 |
|  | TRIETHYLENE GLYCOL | | 4.0 | 4.0 | 4.0 | 4.0 | 4.0 | 4.0 |
|  | PROPYLENE GLYCOL | | 2.0 | 2.0 | 2.0 | 2.0 | 2.0 | 2.0 |
|  | TRIETHYLENE GLYCOL MONOBUTYL ETHER | | 1.0 | 1.0 | 1.0 | 1.0 | 1.0 | 1.0 |
| ORGANIC ALKALI | TRIETHANOLAMINE | | 0.5 | 0.5 | 0.5 | 0.5 | 0.5 | 0.5 |
| INORGANIC ALKALI | NaOH | | 0.03 | 0.03 | 0.03 | 0.03 | 0.03 | 0.03 |
| SURFACTANT | BYK-348 | | 0.3 | 0.3 | 0.3 | 0.3 | 0.3 | 0.3 |
| WATER | ION-EXCHANGED WATER | | BALANCE | BALANCE | BALANCE | BALANCE | BALANCE | BALANCE |
|  | TOTAL | | 100 | 100 | 100 | 100 | 100 | 100 |
|  | SOLID COMPONENT CONCENTRATION OF RESIN [PERCENT BY MASS] | | 12 | 12 | 12 | 12 | 12 | 12 |
|  | SOLID COMPONENT CONCENTRATION OF LUBRICANT [PERCENT BY MASS] | | 1.2 | 1.2 | 0.8 | 4 | 0.6 | 6 |
|  | YOUNG'S MODULUS OF DRIED COATING FILM OF CLEAR INK COMPOSITION [MPa] | | 21 | 21 | 21 | 19 | 21 | 19 |
|  | VISCOSITY [mPa·s] | | 5.5 | 5.4 | 5.3 | 5.4 | 5.3 | 5.4 |

|  |  |  | E7 | E8 | E9 | E10 | E11 | E12 |
|---|---|---|---|---|---|---|---|---|
| RESIN PARTICLES | RESIN A | CROSS-LINKING GROUP-CONTAINING URETHANE | 23.3 | 56.7 | 12.0 | 20.0 | 70.0 | — |
|  | RESIN B | CROSS-LINKING GROUP-CONTAINING URETHANE | — | — | — | — | — | 30.0 |
|  | RESIN C | CROSS-LINKING GROUP-CONTAINING URETHANE | — | — | — | — | — | — |
|  | RESIN D | CROSS-LINKING GROUP-CONTAINING URETHANE | — | — | — | — | — | — |
|  | RESIN E | CROSS-LINKING GROUP-CONTAINING URETHANE | — | — | — | — | — | — |
|  | RESIN F | CROSS-LINKING GROUP-NONCONTAINING URETHANE | — | — | — | — | — | — |
|  | RESIN G | CROSS-LINKING GROUP-CONTAINING ACRYL | — | — | — | — | — | — |
| LUBRICANT | HYTEC E-9015 | | 3.0 | 3.0 | 3.0 | 3.0 | 3.0 | 3.0 |
|  | HYTEC E-8237 | | — | — | — | — | — | — |
|  | AQUACER 593 | | — | — | — | — | — | — |

TABLE 1-continued

|  |  |  |  |  |  |  |  |
|---|---|---|---|---|---|---|---|
|  | AQUACER 497 | — | — | — | — | — | — |
| CROSS-LINKING AGENT | EPOCROS K2010E | — | — | — | — | — | — |
| ORGANIC SOLVENT | GLYCERIN | 13.0 | 10.0 | 13.0 | 13.0 | 13.0 | 11.0 |
|  | TRIETHYLENE GLYCOL | 4.0 | 3.0 | 4.0 | 4.0 | 4.0 | 4.0 |
|  | PROPYLENE GLYCOL | 2.0 | 2.0 | 2.0 | 2.0 | 2.0 | 2.0 |
|  | TRIETHYLENE GLYCOL MONOBUTYL ETHER | 1.0 | 1.0 | 1.0 | 1.0 | 1.0 | 1.0 |
| ORGANIC ALKALI | TRIETHANOLAMINE | 0.5 | 0.5 | 0.5 | 0.5 | 0.5 | 0.5 |
| INORGANIC ALKALI | NaOH | 0.03 | 0.03 | 0.03 | 0.03 | 0.03 | 0.03 |
| SURFACTANT | BYK-348 | 0.3 | 0.3 | 0.3 | 0.3 | 0.3 | 0.3 |
| WATER | ION-EXCHANGED WATER | BALANCE | BALANCE | BALANCE | BALANCE | BALANCE | BALANCE |
|  | TOTAL | 100 | 100 | 100 | 100 | 100 | 100 |
|  | SOLID COMPONENT CONCENTRATION OF RESIN [PERCENT BY MASS] | 7 | 17 | 3.6 | 6 | 21 | 12 |
|  | SOLID COMPONENT CONCENTRATION OF LUBRICANT [PERCENT BY MASS] | 1.2 | 1.2 | 1.2 | 1.2 | 1.2 | 1.2 |
|  | YOUNG'S MODULUS OF DRIED COATING FILM OF CLEAR INK COMPOSITION [MPa] | 21 | 21 | 21 | 21 | 21 | 6 |
|  | VISCOSITY [mPa·s] | 5.0 | 5.8 | 5.0 | 5.0 | 5.0 | 5.6 |

|  |  |  | E13 | E14 | E15 | E16 | E17 |
|---|---|---|---|---|---|---|---|
| RESIN PARTICLES | RESIN A | CROSS-LINKING GROUP-CONTAINING URETHANE | — | 40.0 | 40.0 | 23.3 | 40.0 |
|  | RESIN B | CROSS-LINKING GROUP-CONTAINING URETHANE | — | — | — | — | — |
|  | RESIN C | CROSS-LINKING GROUP-CONTAINING URETHANE | 40.0 | — | — | — | — |
|  | RESIN D | CROSS-LINKING GROUP-CONTAINING URETHANE | — | — | — | — | — |
|  | RESIN E | CROSS-LINKING GROUP-CONTAINING URETHANE | — | — | — | — | — |
|  | RESIN F | CROSS-LINKING GROUP-NONCONTAINING URETHANE | — | — | — | — | — |
|  | RESIN G | CROSS-LINKING GROUP-CONTAINING ACRYL | — | — | — | — | — |
| LUBRICANT |  | HYTEC E-9015 | 3.0 | — | — | 3.0 | 3.0 |
|  |  | HYTEC E-8237 | — | — | — | — | — |
|  |  | AQUACER 593 | — | 4.0 | — | — | — |
|  |  | AQUACER 497 | — | — | 2.4 | — | — |
| CROSS-LINKING AGENT |  | EPOCROS K2010E | — | — | — | 12.5 | — |
| ORGANIC SOLVENT |  | GLYCERIN | 11.0 | 11.0 | 11.0 | 11.0 | 11.0 |
|  |  | TRIETHYLENE GLYCOL | 4.0 | 4.0 | 4.0 | 4.0 | 4.0 |
|  |  | PROPYLENE GLYCOL | 2.0 | 2.0 | 2.0 | 2.0 | 2.0 |
|  |  | TRIETHYLENE GLYCOL MONOBUTYL ETHER | 1.0 | 1.0 | 1.0 | 1.0 | 1.0 |
| ORGANIC ALKALI |  | TRIETHANOLAMINE | 0.5 | 0.5 | 0.5 | 0.5 | 0.5 |
| INORGANIC ALKALI |  | NaOH | 0.03 | 0.03 | 0.03 | 0.03 | 0.03 |
| SURFACTANT |  | BYK-348 | 0.3 | 0.3 | 0.3 | 0.3 | 0.3 |
| WATER |  | ION-EXCHANGED WATER | BALANCE | BALANCE | BALANCE | BALANCE | BALANCE |
|  |  | TOTAL | 100 | 100 | 100 | 100 | 100 |
|  |  | SOLID COMPONENT CONCENTRATION OF RESIN [PERCENT BY MASS] | 12 | 12 | 12 | 7 | 12 |
|  |  | SOLID COMPONENT CONCENTRATION OF LUBRICANT [PERCENT BY MASS] | 1.2 | 1.2 | 1.2 | 1.2 | 1.2 |

TABLE 1-continued

| | | | | | |
|---|---|---|---|---|---|
| YOUNG'S MODULUS OF DRIED COATING FILM OF CLEAR INK COMPOSITION [MPa] | 60 | 21 | 20 | 21 | 21 |
| VISCOSITY [mPa · s] | 5.4 | 5.2 | 5.2 | 5.1 | 5.5 |

TABLE 2

| | | C1 | C2 | C3 | C4 | C5 | C6 | C7 | C8 | C9 |
|---|---|---|---|---|---|---|---|---|---|---|
| RESIN PARTICLES | RESIN A CROSS-LINKING GROUP-CONTAINING URETHANE | — | — | — | — | 40.0 | — | — | — | — |
| | RESIN B CROSS-LINKING GROUP-CONTAINING URETHANE | — | — | — | — | — | 43.3 | — | — | — |
| | RESIN C CROSS-LINKING GROUP-CONTAINING URETHANE | — | — | — | — | — | — | — | — | — |
| | RESIN D CROSS-LINKING GROUP-CONTAINING URETHANE | 33.3 | — | — | — | — | — | — | — | — |
| | RESIN E CROSS-LINKING GROUP-CONTAINING URETHANE | — | 40.0 | — | — | — | — | — | — | 33.3 |
| | RESIN F CROSS-LINKING GROUP-NONCONTAINING URETHANE | — | — | 34.3 | 26.7 | — | — | 20.0 | — | — |
| | RESIN G CROSS-LINKING GROUP-CONTAINING ACRYL | — | — | — | — | — | — | — | — | — |
| LUBRICANT | HYTEC E-9015 | 3.0 | 3.0 | 3.0 | 3.0 | — | — | — | 3.0 | — |
| | HYTEC E-8237 | — | — | — | — | — | — | — | — | — |
| | AQUACER 593 | — | — | — | — | — | — | — | — | — |
| | AQUACER 497 | — | — | — | — | — | — | 12.5 | — | — |
| CROSS-LINKING AGENT | EPOCROS K2010E | — | — | — | — | — | — | — | — | — |
| ORGANIC SOLVENT | GLYCERIN | 11.0 | 11.0 | 11.0 | 11.0 | 11.0 | 11.0 | 11.0 | 11.0 | 11.0 |
| | TRIETHYLENE GLYCOL | 4.0 | 4.0 | 4.0 | 4.0 | 4.0 | 4.0 | 4.0 | 4.0 | 4.0 |
| | PROPYLENE GLYCOL | 2.0 | 2.0 | 2.0 | 2.0 | 2.0 | 2.0 | 2.0 | 2.0 | 2.0 |
| | TRIETHYLENE GLYCOL MONOBUTYL ETHER | 1.0 | 1.0 | 1.0 | 1.0 | 1.0 | 1.0 | 1.0 | 1.0 | 1.0 |
| | TRIETHANOLAMINE | 0.5 | 0.5 | 0.5 | 0.5 | 0.5 | 0.5 | 0.5 | 0.5 | 0.5 |
| INORGANIC ALKALI | NaOH | 0.03 | 0.03 | 0.03 | 0.03 | 0.03 | 0.03 | 0.03 | 0.03 | 0.03 |
| SURFACTANT | BYK-348 | 0.3 | 0.3 | 0.3 | 0.3 | 0.3 | 0.3 | 0.3 | 0.3 | 0.3 |
| WATER | ION-EXCHANGED WATER | BALANCE | BALANCE | BALANCE | BALANCE | BALANCE | BALANCE | BALANCE | BALANCE | BALANCE |
| | TOTAL | 100 | 100 | 100 | 100 | 100 | 100 | 100 | 100 | 100 |
| | SOLID COMPONENT CONCENTRATION OF RESIN [PERCENT BY MASS] | 12 | 12 | 12 | 12 | 12 | 13 | 7 | 0 | 12 |
| | SOLID COMPONENT CONCENTRATION OF LUBRICANT [PERCENT BY MASS] | 1.2 | 1.2 | 1.2 | 1.2 | 0 | 0 | 1.2 | 1.2 | 0 |
| | YOUNG'S MODULUS OF DRIED COATING FILM OF CLEAR INK COMPOSITION [MPa] | 90 | 3 | 12 | 0.2 | 25 | 25 | 14 | 0.4 | 97 |
| | VISCOSITY [mPa·s] | 5.8 | 5.8 | 5.4 | 5.3 | 5.1 | 5.6 | 5.1 | 2.9 | 5.4 |

TABLE 3

|  | COLOR INK COMPOSITION 1 | COLOR INK COMPOSITION 2 |
|---|---|---|
| CYAN PIGMENT DISPERSION (SOLID COMPONENT 15%) | 33.33 | 33.33 |
| RESIN A CROSS-LINKING GROUP-CONTAINING URETHANE | 16.7 | — |
| RESIN F CROSS-LINKING GROUP-NONCONTAINING URETHANE | — | 14.3 |
| GLYCERIN | 10.0 | 10.0 |
| TRIETHYLENE GLYCOL | 4.0 | 4.0 |
| TRIETHYLENE GLYCOL MONOBUTYL ETHER | 1.0 | 1.0 |
| TRIETHANOLAMINE | 0.5 | 0.5 |
| BYK-348 | 0.3 | 0.3 |
| ION-EXCHANGED WATER | BALANCE | BALANCE |
| TOTAL | 100 | 100 |

Recording Method (Examples 1 to 25, 27, and 28, and Comparative Examples 1 to 9)

As a cloth, a white cotton broad was prepared.

Pre-Treatment

After a pre-treatment agent formed from 6.7 parts of Unisence 104L (water-soluble cationic polymer, manufactured by Senka Corporation) and 93.3 parts of water was padded on the cotton broad cloth by a padding method at a pick up rate of 70%, drying was performed at 120° C. for 5 minutes, so that a pre-treated cloth was obtained.

Image Formation

Next, after the color ink composition and the clear ink composition were filled in combinations as shown in Tables 4 to 6 in an ink jet printer ("PX-G930" manufactured by Seiko Epson Corporation) so as to be ejected from different nozzle lines, the color ink composition and the clear ink composition were adhered to the pre-treated cloth, so that an image was formed. In addition, when the image was formed, the color ink composition and the clear ink composition were both ejected while the carriage was scanned once. The scanning was a main scanning direction of the carriage. The image thus formed was an image having a portion at which a dot formed by the color ink composition and a dot formed by the clear ink composition were overlapped with each other.

In the above image forming step, the resolution was set to 1,440×720 dpi, a printing range was set to an A4 size, and solid printing was performed by the color ink composition and the clear ink composition, the coating amounts of which were set as shown in Tables 4 to 6, so that the image was formed. The coating amounts (g/m²) of the color ink composition and the clear ink composition were as shown in Tables 4 to 6. Subsequently, by the use of a high temperature steamer (product name: "HT-3-550 model", manufactured by Tsujii Dyeing Machine Manufacturing Co., Ltd.), drying was performed under the drying conditions shown in Tables 4 to 6, so that a printed material in which the image was formed on the pre-treated cloth was manufactured.

Recording Method (Example 26)

As a cloth, a white cotton broad was prepared.

Pre-Treatment

After a pre-treatment agent formed from 6.7 parts of Unisence 104L (water-soluble cationic polymer, manufactured by Senka Corporation) and 93.3 parts of water was padded on the cotton broad cloth by a padding method at a pick up rate of 70%, drying was performed at 120° C. for 5 minutes, so that a pre-treated cloth was obtained.

Image Formation

Next, the color ink composition 1 was adhered to the pre-treated cloth by an ink jet method using an ink jet printer (product name: "PX-G930" manufactured by Seiko Epson Corporation), so that an image was formed. In the above image forming step, the resolution was set to 1,440×720 dpi, a printing range was set to an A4 size, and solid printing was performed by the coating amount of the color ink composition 1 shown in Table 5, so that the image was formed. Subsequently, the clear ink composition E1 was coated by a padding method on the cloth on which the image was formed. The pick up rate was adjusted, so that he coating amount of the clear ink composition was set to the value shown in Table 5. Next, by the use of a high temperature steamer (product name: "HT-3-550 model", manufactured by Tsujii Dyeing Machine Manufacturing Co., Ltd.), drying was performed under the drying conditions shown in Table 5, so that a printed material in which the image was formed on the pre-treated cloth was manufactured.

In Tables 4 to 6, the "ratio of total content of resin particles to pigment amount" indicates a mass ratio of the total of the content of the resin particles in the color ink composition and the content of the resin particles in the clear ink composition with respect to the solid component of the pigment in the color ink composition, and the "ratio of content of lubricant to pigment amount" indicates a mass ratio of the content of the lubricant in the clear ink composition with respect to the solid component of the pigment in the color ink composition.

Recording Method (Examples 29 to 46)

As a cloth, a cotton T shirt (manufactured by Fast Retailing Co., Ltd.) in which a black mouse pattern wearing a pair of yellow shoes was screen-printed on a cloth was prepared.

By the use of an ink jet printer ("PX-G930" manufactured by Seiko Epson Corporation), an image was formed by ejecting the clear ink composition shown in Table 5 so as to be overlapped with the yellow and the black printed portions of this cloth. In the above image forming step, the resolution was set to 1,440×720 dpi, a printing range was set to an A4 size, and solid printing was performed by the coating amount of the clear ink composition shown in Table 7, so that the image was formed. Next, by the use of a high temperature steamer (product name: "HT-3-550 model", manufactured by Tsujii Dyeing Machine Manufacturing Co., Ltd.), drying was performed under the drying conditions shown in Table 7, so that a printed material was manufactured.

Evaluation of Abrasion Fastness (Examples 1 to 28 and Comparative Examples 1 to 9)

An abrasion fastness test of each printed material was performed in accordance with JIS L0849 abrasion tester II using a Gakushin type AB-301 manufactured by Tester Sangyo Co., Ltd. In the abrasion fastness test, the load was set to 200 g, the number of reciprocating motions was set to 100, and as an abrasion cloth, a JIS dyeing fastness testing white cloth (No. 3-1 in accordance with JIS L 0803, Calico No. 3) was used. The grade of fastness was judged by visual inspection using a gray scale, so the abrasion fastness of the printed material was evaluated. The evaluation criteria were as follows. The results of the dry abrasion fastness and the wet abrasion fastness are shown in Tables 4 to 6 as the abrasion fastness/dry and the abrasion fastness/wet, respectively. When the dry abrasion fastness and the wet abrasion fastness were both evaluated as the B rank or more, it can be said that a preferable effect is obtained.

Evaluation Criteria of Dry Abrasion Fastness

S: Dry_fourth/fifth grade or more
A: Dry_third/fourth grade or Dry_fourth grade
B: Dry_third grade
C: Dry_second/third grade or less Evaluation Criteria of Wet Abrasion Fastness S: Wet_fourth grade or more
A: Wet_third grade or Wet_third/fourth grade
B: Wet_second/third grade
C: Wet_second grade or less Evaluation of Abrasion Fastness (Examples 29 to 46)

The abrasion fastness test of each printed material was performed in a manner similar to that of the above "Evaluation of abrasion fastness (Examples 1 to 28 and Comparative Examples 1 to 8)", so that the abrasion fastness of the printed material was evaluated. The evaluation criteria are as described below. The evaluation results of the dry abrasion fastness and the wet abrasion fastness are shown in Table 7 as the abrasion fastness/dry and the abrasion fastness/wet, respectively.

In addition, when the abrasion fastness of the yellow and black printed portions of the cloth used in the above "Recording Methods (Examples 29 to 46)" was evaluated in a manner similar to that of the "Evaluation of Abrasion Fastness (Examples 1 to 28 and Comparative Examples 1 to 9)", the dry abrasion fastness and the wet abrasion fastness were ranked as the third grade and the first/second grade, respectively. When the dry abrasion fastness and the wet abrasion fastness were both evaluated as the B rank or more, it can be said that a preferable effect is obtained.

Evaluation Criteria of Dry Abrasion Fastness

S: Dry_fourth/fifth grade or more
A: Dry_fourth grade
B: Dry_third/fourth grade
C: Dry_third grade or less Evaluation Criteria of Wet Abrasion Fastness S: Wet_fourth grade or more
A: Wet_third grade or Wet_third/fourth grade
B: Wet_second/third grade
C: Wet_second grade or less Evaluation of Texture (Examples 1 to 28 and Comparative Examples 1 to 9)

After the printed materials obtained by the recording method described above were each cut into a size of 20×20 cm, by the use of a tensile shear testing machine (product name: "KES-FB1-A") manufactured by Kato Tech Co., Ltd., a tension-curvature curve was measured at a shear tension of 10 gf/cm and a shear slip angle of ±8°. By the linear regression between curvatures of 0.5° to 2.5° of the measured tension-curvature curve, a shear hardness A [gf/(cm·deg)] was obtained. In addition, a printed material in which the color ink composition was only coated by the recording method described above was formed, and a shear hardness B was obtained in a manner similar to that of the above printed material. The absolute value of the difference between the shear hardness of the printed material obtained by coating the clear ink composition and the color ink composition and the shear hardness of the printed material obtained by only coating the color ink composition was calculated, so that the texture was evaluated. The evaluation criteria are as described below.

Evaluation Criteria

S: Absolute value of difference between shear hardness A and shear hardness B was 0.5 or less.
A: Absolute value of difference between shear hardness A and shear hardness B was more than 0.5 to 1.0.
B: Absolute value of difference between shear hardness A and shear hardness B was more than 1.0 to 1.5.
C: Absolute value of difference between shear hardness A and shear hardness B was more than 1.5.

Evaluation of Texture (Examples 29 to 46)

After the printed materials obtained by the recording method described above were each cut into a size of 20×20 cm, by the use of a tensile shear testing machine (product name: "KES-FB1-A") manufactured by Kato Tech Co., Ltd., a tension-curvature curve was measured at a shear tension of 10 gf/cm and a shear slip angle of ±8°. By the linear regression between curvatures of 0.5° to 2.5° of the measured tension-curvature curve, a shear hardness A [gf/(cm·deg)] was obtained. In addition, a shear hardness B of the cloth used in the above "Recording Method (Examples 29 to 46)" was obtained in a manner similar to that of the above printed material. The absolute value of the difference between the shear hardness of the printed material obtained by coating the clear ink composition and the shear hardness of the cloth before the clear ink composition was coated was calculated, so that the texture was evaluated. The evaluation criteria are as described below.

Evaluation Criteria

S: Absolute value of difference between shear hardness A and shear hardness B was 0.5 or less.
A: Absolute value of difference between shear hardness A and shear hardness B was more than 0.5 to 1.0.
B: Absolute value of difference between shear hardness A and shear hardness B was more than 1.0 to 1.5.
C: Absolute value of difference between shear hardness A and shear hardness B was more than 1.5.

Evaluation of Head Reliability

After normal ejection from all the nozzles was confirmed, and the nozzles were then left at a room temperature of 40°

C. and a humidity of 20% for a time described in the following evaluation standard, 10 cc of each clear ink composition was discharged from a head. The clear ink composition was filled in a head having 360 nozzles of an ink jet printer "SC-S30650" manufactured by Seiko Epson Corporation, and subsequently, an ejection test was performed whether the clear ink composition was normally ejected from each nozzle or not, so that the head reliability was evaluated. The evaluation criteria are as described below.

Evaluation Criteria

S: In a nozzle inspection performed one month later, normal ejection was performed by all the nozzles.
A: In a nozzle inspection performed three weeks later, normal ejection was performed by all the nozzles, but in a nozzle inspection performed one month later, normal ejection was not performed by some nozzles.
B: In a nozzle inspection performed two weeks later, normal ejection was performed by all the nozzles, but in a nozzle inspection performed three weeks later, normal ejection was not performed by some nozzles.
C: In a nozzle inspection performed two weeks later, normal ejection was not performed by some nozzles.

Evaluation of Storage Stability

After each clear ink composition was charged in a glass-made sample bottle and then tightly sealed, those glass bottles were placed in a constant-temperature bath at 50° C. and then left in an atmosphere of 50° C. for 7 days and 14 days. After the ink composition was left for the times described above, the temperature was sufficiently decreased to room temperature, and the viscosity was measured. By the use of a viscoelasticity measurement device MCR-300 (product name) manufactured by Pysica, the viscosity was obtained in such a way that after the temperature of the clear ink composition was controlled to 25° C., the viscosity was read when the shear rate was 200. In addition, a viscosity change rate A measured 7 days later and a viscosity change rate B measured 14 days later, each of which was with respect to the initial viscosity, were calculated.

Evaluation criteria are as described below.
A: The viscosity change rates A and B were both less than ±7%.
B: The viscosity change rate A was ±7% to less than ±10%, and the viscosity change rate B was ±7% to less than ±10%.
C: The viscosity change rate A was ±7% to less than ±10%, and the viscosity change rate B was ±10% to less than ±15%.

Evaluation of Image Quality

Bleeding at the boundary between a portion at which an image of the printed material was formed by the above recording method and a portion at which the image was not formed was observed by visual inspection, so that the image quality was evaluated. The evaluation criteria are as described below.
A: No bleeding was observed.
B: Bleeding was slightly observed.
C: Bleeding was apparently observed.

TABLE 4

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| CLEAR INK COMPOSITION | E1 | E2 | E3 | E4 | E5 | E6 | E7 | E8 |
| COLOR INK COMPOSITION | 1 | 1 | 1 | 1 | 1 | 1 | 1 | 1 |
| DRYING CONDITIONS | 160° C. 5 MINUTES | 160° C. 5 MINUTES | 160° C. 5 MINUTES | 160° C. 5 MINUTES | 160° C. 5 MINUTES | 160° C. 5 MINUTES | 160° C. 5 MINUTES | 160° C. 5 MINUTES |
| COLOR INK COATING AMOUNT (g/m$^2$) | 35 | 35 | 35 | 35 | 35 | 35 | 35 | 35 |
| CLEAR INK COATING AMOUNT (g/m$^2$) | 14 | 14 | 14 | 14 | 14 | 14 | 14 | 14 |
| COATING AMOUNT RATIO OF CLEAR INK TO COLOR INK | 0.4 | 0.4 | 0.4 | 0.4 | 0.4 | 0.4 | 0.4 | 0.4 |
| RATIO OF TOTAL CONTENT OF RESIN PARTICLES TO PIGMENT AMOUNT | 3.4 | 3.4 | 3.4 | 3.4 | 3.4 | 3.4 | 2.4 | 4.4 |
| RATIO OF CONTENT OF LUBRICANT TO PIGMENT AMOUNT | 0.2 | 0.2 | 0.2 | 0.8 | 0.1 | 1.2 | 0.2 | 0.2 |
| ABRASION FASTNESS DRY | S | S | A | S | B | S | S | S |
| ABRASION FASTNESS WET | A | A | A | A | A | A | B | S |
| TEXTURE | A | A | A | S | B | S | S | B |
| HEAD RELIABILITY | S | A | S | B | S | C | S | B |
| STORAGE STABILITY | A | B | A | B | A | C | A | B |

TABLE 4-continued

| | | | | | | | | |
|---|---|---|---|---|---|---|---|---|
| IMAGE QUALITY (BLEEDING) | A | A | A | A | A | A | A | A |

| | EXAMPLE 9 | EXAMPLE 10 | EXAMPLE 11 | EXAMPLE 12 | EXAMPLE 13 | EXAMPLE 14 | EXAMPLE 15 | EXAMPLE 16 | EXAMPLE 17 |
|---|---|---|---|---|---|---|---|---|---|
| CLEAR INK COMPOSITION | E9 | E10 | E11 | E12 | E13 | E14 | E15 | E16 | E17 |
| COLOR INK COMPOSITION | 1 | 1 | 1 | 1 | 1 | 1 | 1 | 1 | 1 |
| DRYING CONDITIONS | 160° C. 5 MINUTES | 160° C. 5 MINUTES | 160° C. 5 MINUTES | 160° C. 5 MINUTES | 160° C. 5 MINUTES | 160° C. 5 MINUTES | 160° C. 5 MINUTES | 160° C. 5 MINUTES | 160° C. 5 MINUTES |
| COLOR INK COATING AMOUNT (g/m²) | 35 | 35 | 35 | 35 | 35 | 35 | 35 | 35 | 35 |
| CLEAR INK COATING AMOUNT (g/m²) | 14 | 14 | 14 | 14 | 14 | 14 | 14 | 14 | 14 |
| COATING AMOUNT RATIO OF CLEAR INK TO COLOR INK | 0.4 | 0.4 | 0.4 | 0.4 | 0.4 | 0.4 | 0.4 | 0.4 | 0.4 |
| RATIO OF TOTAL CONTENT OF RESIN PARTICLES TO PIGMENT AMOUNT | 1.7 | 2.2 | 5.2 | 2.8 | 3.4 | 3.4 | 3.4 | 2.4 | 3.4 |
| RATIO OF CONTENT OF LUBRICANT TO PIGMENT AMOUNT | 0.2 | 0.2 | 0.2 | 0.2 | 0.2 | 0.2 | 0.2 | 0.2 | 0.2 |
| ABRASION FASTNESS DRY | B | A | S | S | S | B | B | S | S |
| ABRASION FASTNESS WET | B | B | S | B | A | A | A | A | A |
| TEXTURE | S | S | B | S | B | A | A | A | A |
| HEAD RELIABILITY | S | S | C | S | S | S | B | B | B |
| STORAGE STABILITY | S | A | C | A | A | A | C | C | A |
| IMAGE QUALITY (BLEEDING) | A | A | A | A | A | A | A | A | A |

TABLE 5

| | EXAMPLE 18 | EXAMPLE 19 | EXAMPLE 20 | EXAMPLE 21 | EXAMPLE 22 | EXAMPLE 23 |
|---|---|---|---|---|---|---|
| CLEAR INK COMPOSITION | E1 | E1 | E1 | E1 | E1 | E1 |
| COLOR INK COMPOSITION | 1 | 1 | 1 | 1 | 1 | 1 |
| DRYING CONDITIONS | 160° C. 5 MINUTES | 160° C. 5 MINUTES | 160° C. 5 MINUTES | 160° C. 5 MINUTES | 160° C. 5 MINUTES | 120° C. 5 MINUTES |
| COLOR INK COATING AMOUNT (g/m²) | 35 | 35 | 35 | 35 | 75 | 35 |
| CLEAR INK COATING AMOUNT (g/m²) | 17.5 | 10.5 | 24.5 | 7 | 30 | 14 |
| COATING AMOUNT RATIO OF CLEAR INK TO COLOR INK | 0.5 | 0.3 | 0.7 | 0.2 | 0.4 | 0.4 |
| RATIO OF TOTAL CONTENT OF RESIN PARTICLES TO PIGMENT AMOUNT | 3.4 | 3.4 | 3.4 | 3.4 | 3.4 | 3.4 |
| RATIO OF CONTENT OF LUBRICANT TO PIGMENT AMOUNT | 0.2 | 0.2 | 0.2 | 0.2 | 0.2 | 0.2 |
| ABRASION FASTNESS DRY | S | S | S | A | S | A |
| ABRASION FASTNESS WET | S | B | S | B | A | B |
| TEXTURE | A | S | B | S | A | S |
| HEAD RELIABILITY | S | S | S | S | S | S |

TABLE 5-continued

|  | | | | | | |
|---|---|---|---|---|---|---|
| STORAGE STABILITY | A | A | A | A | A | A |
| IMAGE QUALITY (BLEEDING) | B | A | C | A | B | A |

|  | EXAMPLE 24 | EXAMPLE 25 | EXAMPLE 26 | EXAMPLE 27 | EXAMPLE 28 |
|---|---|---|---|---|---|
| CLEAR INK COMPOSITION | E1 | E1 | E1 | E1 | E1 |
| COLOR INK COMPOSITION | 1 | 1 | 1 | 1 | 2 |
| DRYING CONDITIONS | 110° C. 5 MINUTES | 160° C. 5 MINUTES | 160° C. 5 MINUTES | 160° C. 5 MINUTES | 160° C. 5 MINUTES |
| COLOR INK COATING AMOUNT (g/m$^2$) | 35 | 35 | 35 | 105 | 35 |
| CLEAR INK COATING AMOUNT (g/m$^2$) | 14 | 35 | 65 | 42 | 14 |
| COATING AMOUNT RATIO OF CLEAR INK TO COLOR INK | 0.4 | 1 | 1.86 | 0.4 | 0.4 |
| RATIO OF TOTAL CONTENT OF RESIN PARTICLES TO PIGMENT AMOUNT | 3.4 | 3.4 | 3.4 | 3.4 | 3.4 |
| RATIO OF CONTENT OF LUBRICANT TO PIGMENT AMOUNT | 0.2 | 0.2 | 0.2 | 0.2 | 0.2 |
| ABRASION FASTNESS DRY | B | S | S | S | A |
| ABRASION FASTNESS WET | B | S | S | A | B |
| TEXTURE | S | B | B | B | A |
| HEAD RELIABILITY | S | S | — | S | S |
| STORAGE STABILITY | A | A | A | A | A |
| IMAGE QUALITY (BLEEDING) | A | C | A | C | A |

TABLE 6

|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| CLEAR INK COMPOSITION | C1 | C2 | C3 | C4 | C5 |
| COLOR INK COMPOSITION | 1 | 1 | 1 | 1 | 1 |
| DRYING CONDITIONS | 160° C. 5 MINUTES | 160° C. 5 MINUTES | 160° C. 5 MINUTES | 160° C. 5 MINUTES | 160° C. 5 MINUTES |
| COLOR INK COATING AMOUNT (g/m$^2$) | 35 | 35 | 35 | 35 | 35 |
| CLEAR INK COATING AMOUNT (g/m$^2$) | 14 | 14 | 14 | 14 | 14 |
| COATING AMOUNT RATIO OF CLEAR INK TO COLOR INK | 0.4 | 0.4 | 0.4 | 0.4 | 0.4 |
| RATIO OF TOTAL CONTENT OF RESIN PARTICLES TO PIGMENT AMOUNT | 3.4 | 3.4 | 3.4 | 3.4 | 3.4 |
| RATIO OF CONTENT OF LUBRICANT TO PIGMENT AMOUNT | 0.2 | 0.2 | 0.2 | 0.2 | 0.0 |
| ABRASION FASTNESS DRY | A | A | S | A | C |
| ABRASION FASTNESS WET | B | C | C | C | A |
| TEXTURE | C | S | A | S | A |
| HEAD RELIABILITY | S | C | S | C | A |
| STORAGE STABILITY | A | C | C | C | A |
| IMAGE QUALITY (BLEEDING) | A | A | A | A | B |

TABLE 6-continued

|  | COMPARATIVE EXAMPLE 6 | COMPARATIVE EXAMPLE 7 | COMPARATIVE EXAMPLE 8 | COMPARATIVE EXAMPLE 9 |
|---|---|---|---|---|
| CLEAR INK COMPOSITION | C6 | C7 | C8 | C9 |
| COLOR INK COMPOSITION | 1 | 1 | 1 | 1 |
| DRYING CONDITIONS | 160° C. 5 MINUTES | 160° C. 5 MINUTES | 160° C. 5 MINUTES | 160° C. 5 MINUTES |
| COLOR INK COATING AMOUNT (g/m$^2$) | 35 | 35 | 35 | 35 |
| CLEAR INK COATING AMOUNT (g/m$^2$) | 14 | 14 | 14 | 14 |
| COATING AMOUNT RATIO OF CLEAR INK TO COLOR INK | 0.4 | 0.4 | 0.4 | 0.4 |
| RATIO OF TOTAL CONTENT OF RESIN PARTICLES TO PIGMENT AMOUNT | 3.6 | 2.4 | 1.0 | 3.4 |
| RATIO OF CONTENT OF LUBRICANT TO PIGMENT AMOUNT | 0.0 | 0.2 | 0.2 | 0.0 |
| ABRASION FASTNESS DRY | C | B | C | C |
| ABRASION FASTNESS WET | S | C | C | B |
| TEXTURE | A | A | S | C |
| HEAD RELIABILITY | A | B | S | S |
| STORAGE STABILITY | B | C | A | A |
| IMAGE QUALITY (BLEEDING) | A | A | A | A |

TABLE 7

|  | EXAMPLE 29 | EXAMPLE 30 | EXAMPLE 31 | EXAMPLE 32 | EXAMPLE 33 | EXAMPLE 34 |
|---|---|---|---|---|---|---|
| CLEAR INK | E1 | E2 | E3 | E4 | E5 | E6 |
| DRYING CONDITIONS | 160° C. 5 MINUTES | 160° C. 5 MINUTES | 160° C. 5 MINUTES | 160° C. 5 MINUTES | 160° C. 5 MINUTES | 160° C. 5 MINUTES |
| CLEAR INK COATING AMOUNT (g/m$^2$) | 14 | 14 | 14 | 14 | 14 | 14 |
| ABRASION FASTNESS DRY | S | S | A | S | B | S |
| ABRASION FASTNESS WET | A | A | A | A | A | A |
| TEXTURE | S | S | S | S | A | S |
| HEAD RELIABILITY | S | A | S | B | S | C |
| STORAGE STABILITY | A | B | A | B | A | C |
| IMAGE QUALITY (BLEEDING) | A | A | A | A | A | A |

|  | EXAMPLE 35 | EXAMPLE 36 | EXAMPLE 37 | EXAMPLE 38 | EXAMPLE 39 | EXAMPLE 40 |
|---|---|---|---|---|---|---|
| CLEAR INK | E7 | E8 | E9 | E10 | E11 | E12 |
| DRYING CONDITIONS | 160° C. 5 MINUTES | 160° C. 5 MINUTES | 160° C. 5 MINUTES | 160° C. 5 MINUTES | 160° C. 5 MINUTES | 160° C. 5 MINUTES |
| CLEAR INK COATING AMOUNT (g/m$^2$) | 14 | 14 | 14 | 14 | 14 | 14 |
| ABRASION FASTNESS DRY | S | S | B | A | S | S |
| ABRASION FASTNESS WET | B | S | B | B | S | B |
| TEXTURE | S | A | S | S | A | S |
| HEAD RELIABILITY | S | B | S | S | C | S |
| STORAGE STABILITY | A | B | S | A | C | A |
| IMAGE QUALITY (BLEEDING) | A | A | A | A | A | A |

TABLE 7-continued

|  | EXAMPLE 41 | EXAMPLE 42 | EXAMPLE 43 | EXAMPLE 44 | EXAMPLE 45 | EXAMPLE 46 |
|---|---|---|---|---|---|---|
| CLEAR INK | E13 | E14 | E15 | E16 | E17 | E1 |
| DRYING CONDITIONS | 160° C. 5 MINUTES | 160° C. 5 MINUTES | 160° C. 5 MINUTES | 160° C. 5 MINUTES | 160° C. 5 MINUTES | 160° C. 5 MINUTES |
| CLEAR INK COATING AMOUNT (g/m$^2$) | 14 | 14 | 14 | 14 | 14 | 35 |
| ABRASION DRY | S | B | B | S | S | S |
| FASTNESS WET | A | A | A | A | A | A |
| TEXTURE | A | S | S | S | S | B |
| HEAD RELIABILITY | S | S | B | B | B | S |
| STORAGE STABILITY | A | A | C | C | A | A |
| IMAGE QUALITY (BLEEDING) | A | A | A | A | A | A |

According to Examples, it was found that since the clear ink composition contained the resin particles, the lubricant, and water, the resin of the resin particles included the urethane resin having a cross-linking group, and the dried coating film of the clear ink composition had a Young's modulus of 5 to 70 MPa, the dry abrasion fastness, the wet abrasion fastness, and the texture could be improved.

When Example 1 and Comparative Example 1 were compared to each other, it was found that when the Young's modulus of the dried coating film of the clear ink composition was 70 MPa or less, the degradation in texture could be suppressed, and furthermore, the abrasion fastness could be improved. In addition, when Example 1 and Comparative Example 2 were compared to each other, it was found that when the Young's modulus of the dried coating film of the clear ink composition was 5 MPa or more, the abrasion fastness, in particular, the wet abrasion fastness, the head reliability, and the storage stability could be improved.

When Example 1 and Comparative Example 3 were compared to each other, it was found that since the urethane resin in the clear ink composition had a cross-linking group, the wet abrasion fastness and the storage stability could be improved.

When Example 1 and Comparative Example 4 were compared to each other, it was found that since the clear ink composition included the urethane resin as the resin of the resin particles, the abrasion fastness, the head reliability, and the storage stability could be improved.

When Example 1 was compared to Comparative Examples 5 and 6, it was found that since the clear ink composition included the lubricant, the dry abrasion fastness, the head reliability, and the suppression of the bleeding could be improved.

When Example 1 and Comparative Example 7 were compared to each other, it was found that since the clear ink composition included the urethane resin having a cross-linking group instead of including the cross-linking agent and the urethane resin having no cross-linking group in combination, the abrasion fastness, the head reliability, and the storage stability could be improved.

When Example 1 and Comparative Example 8 were compared to each other, it was found that since the clear ink composition included the resin particles, the abrasion fastness could be improved.

When Example 2 and Example 15 were compared to each other, it was found that since the lubricant had a melting point of 90° C. or more, the clear ink composition could further improve the dry abrasion fastness, the head reliability, and the storage stability.

When Example 1 and Example 14 were compared to each other, it was found that since the lubricant had a melting point of 150° C. or less, the clear ink composition could further improve the dry abrasion fastness.

When Example 1 and Example 17 were compared to each other, it was found that since the organic alkali and the inorganic alkali were used together, the clear ink composition could further improve the head reliability and the storage stability.

When Example 1 and Example 26 were compared to each other, it was found that when the clear ink composition was used for the ink jet coating instead of the padding coating, the clear ink composition could further improve the texture.

From the result of Comparative Example 9, it was found that when the Young's modulus was high, although the wet abrasion fastness was improved, if the Young's modulus was excessively high, the texture was degraded, and the dry abrasion fastness was insufficient. On the other hand, from the result of Example 1, it was found that since the lubricant was further used together, the Young's modulus was decreased, and hence, excellent abrasion fastness and texture could be simultaneously obtained.

The entire disclosure of Japanese Patent Application No. 2018-049596, filed Mar. 16, 2018 is expressly incorporated by reference herein.

What is claimed is:

1. An ink jet printing clear ink composition comprising:
resin particles;
a lubricant;
a metal hydroxide;
water; and
a cross-linking agent
wherein the cross-linking agent is at least one selected from the group consisting of an isocyanate-based cross-linking agent, an oxazoline-based cross-linking agent, and a carbodiimide-based cross-linking agent,
the resin particles includes an urethane resin having a cross-linking group,
a content of the lubricant with respect to the total mass of the clear ink composition is 3 to 5 percent by mass; and
the ink jet printing clear ink composition is configured to be formed into a dried coating film having a Young's modulus of 5 to 70 MPa.

2. The ink jet printing clear ink composition according to claim 1,
wherein the urethane resin having a cross-linking group has a polycarbonate skeleton.

3. The ink jet printing clear ink composition according to claim 1,
wherein the content of the resin particles with respect to the total mass of the clear ink composition is 7 to 20 percent by mass.

4. The ink jet printing clear ink composition according to claim 1,
wherein the lubricant has a melting point of 90° C. to 150° C.

5. The ink jet printing clear ink composition according to claim 1,
wherein the cross-linking group is at least one of a blocked isocyanate group and a silanol group.

6. An ink jet printing ink set comprising:
the ink jet printing clear ink composition according to claim 1; and
an ink jet printing color ink composition containing a pigment, resin particles, and water.

7. An ink jet printing ink set comprising:
the ink jet printing clear ink composition according to claim 2; and
an ink jet printing color ink composition containing a pigment, resin particles, and water.

8. An ink jet printing ink set comprising:
the ink jet printing clear ink composition according to claim 3; and
an ink jet printing color ink composition containing a pigment, resin particles, and water.

9. An ink jet printing ink set comprising:
the ink jet printing clear ink composition according to claim 4; and
an ink jet printing color ink composition containing a pigment, resin particles, and water.

10. The ink jet printing ink set according to claim 6,
wherein the resin particles in the color ink composition includes an urethane resin having a cross-linking group.

11. The ink jet printing ink set according to claim 6,
wherein the total of the content of the resin particles in the color ink composition and the content of the resin particles in the clear ink composition with respect to a solid component of the pigment in the color ink composition is 1.8 to 4.5 on a mass ratio basis.

12. An ink jet printing method comprising:
forming an image by ejecting the clear ink composition and the color ink composition of the ink jet printing ink set according to claim 6 to a cloth using an ink jet recording apparatus.

13. The ink jet printing method according to claim 12,
wherein in the forming an image, the clear ink composition and the color ink composition are simultaneously ejected.

14. The ink jet printing method according to claim 12,
wherein in the forming an image, the clear ink composition and the color ink composition are ejected in the same scan.

15. The ink jet printing method according to claim 12,
wherein an adhesion amount of the clear ink composition per unit area of the cloth with respect to an adhesion amount of the color ink composition per unit area of the cloth is 0.25 to 0.60 on a mass ratio basis.

16. The ink jet printing method according to claim 12,
wherein an adhesion amount of the clear ink composition per unit area of the cloth is 10 to 40 $g/m^2$.

17. The ink jet printing method according to claim 12, further comprising:
drying the image by heating,
wherein the drying is performed at a drying temperature of 120° C. or more.

* * * * *